(12) United States Patent
Sun et al.

(10) Patent No.: US 10,177,889 B2
(45) Date of Patent: Jan. 8, 2019

(54) SEQUENCE GENERATION METHOD, AND TERMINAL AND BASE STATION FOR TERMINAL FOR SEQUENCE GENERATION TERMINAL AND A BASE STATION FOR SEQUENCE GENERATION

(71) Applicant: Huawei Technologies Co., Ltd., Shenzhen (CN)

(72) Inventors: Jingyuan Sun, Shenzhen (CN); Lixia Xue, Beijing (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

(21) Appl. No.: 15/360,815

(22) Filed: Nov. 23, 2016

(65) Prior Publication Data

US 2017/0078067 A1 Mar. 16, 2017

Related U.S. Application Data

(63) Continuation of application No. PCT/CN2014/078246, filed on May 23, 2014.

(51) Int. Cl.
*H04L 12/28* (2006.01)
*H04L 5/00* (2006.01)
(Continued)

(52) U.S. Cl.
CPC ........ *H04L 5/0048* (2013.01); *H04L 27/2601* (2013.01); *H04L 27/2613* (2013.01);
(Continued)

(58) Field of Classification Search
USPC ................................ 370/252, 329, 386, 430
See application file for complete search history.

(56) References Cited

U.S. PATENT DOCUMENTS 8,320,360 B2 * 11/2012 Fukuta ................ H04J 11/0069
370/324
8,428,157 B2 4/2013 Kakura et al.
(Continued)

FOREIGN PATENT DOCUMENTS

CN 101132383 A 2/2008
CN 101242219 A 8/2008
(Continued)

OTHER PUBLICATIONS

"SCH Structure and Sequences for Cell Search," 3GPP TSG-RAN WG1 #46bis, Seoul, Korea, R1-062560, 3rd Generation Partnership Project, Valbonne, France (Oct. 9-13, 2006).

*Primary Examiner* — John Pezzlo
(74) *Attorney, Agent, or Firm* — Leydig, Voit & Mayer, Ltd.

(57) ABSTRACT

The present invention discloses a sequence generation method and a base station. The method includes: determining, by a terminal, at least one first sequence according to at least one candidate sequence, where a length of the candidate sequence is less than a sequence length corresponding to a maximum available system bandwidth; and connecting, by the terminal, the at least one first sequence to generate a second sequence or directly using the at least one first sequence as a second sequence, and receiving a signal according to the second sequence, where the second sequence is at least one of a reference signal sequence or a scrambling code sequence.

13 Claims, 5 Drawing Sheets

(51) Int. Cl.
  *H04W 16/02* (2009.01)
  *H04L 27/26* (2006.01)
  *H04W 72/04* (2009.01)
  *H04J 1/16* (2006.01)
  *H04W 88/08* (2009.01)

(52) U.S. Cl.
  CPC ....... *H04W 16/02* (2013.01); *H04W 72/0446* (2013.01); *H04W 72/0453* (2013.01); *H04W 88/08* (2013.01)

(56) References Cited

U.S. PATENT DOCUMENTS

| | | | |
|---|---|---|---|
| 8,842,515 | B2 | 9/2014 | Lee et al. |
| 9,009,207 | B2 | 4/2015 | Yoon |
| 2006/0029165 | A1 | 2/2006 | Jechoux et al. |
| 2008/0212555 | A1 | 9/2008 | Kim et al. |
| 2009/0285327 | A1 | 11/2009 | Iwai et al. |
| 2009/0303960 | A1* | 12/2009 | Qu .................. H04B 7/022 370/330 |
| 2010/0118799 | A1 | 5/2010 | Lee et al. |
| 2011/0075760 | A1 | 3/2011 | Ogawa et al. |
| 2012/0176885 | A1 | 7/2012 | Lee et al. |
| 2012/0207199 | A1 | 8/2012 | Guo et al. |
| 2013/0157667 | A1 | 6/2013 | Nakamura et al. |
| 2013/0266088 | A1 | 10/2013 | Kim et al. |
| 2015/0009847 | A1 | 1/2015 | Iwai et al. |

FOREIGN PATENT DOCUMENTS

| | | |
|---|---|---|
| CN | 102484577 A | 5/2012 |
| CN | 102598537 A | 7/2012 |
| CN | 102769592 A | 11/2012 |
| EP | 2161942 A1 | 3/2010 |
| JP | 2002185370 A | 6/2002 |
| JP | 2009044698 A | 2/2009 |
| JP | 2012070366 A | 4/2012 |
| JP | 2013504278 A | 2/2013 |
| JP | 2013165497 A | 8/2013 |
| JP | 5349308 B2 | 11/2013 |
| KR | 20120080605 A | 7/2012 |
| WO | WO 2004040817 A1 | 5/2004 |
| WO | 2007148796 A1 | 12/2007 |
| WO | WO 2009032521 A1 | 3/2009 |
| WO | 2013132773 A1 | 9/2013 |
| WO | 2013147693 A1 | 10/2013 |

* cited by examiner

▮ Direct current subcarrier

Frequency band accessed by a terminal

SEQUENCE GENERATION METHOD, AND TERMINAL AND BASE STATION FOR TERMINAL FOR SEQUENCE GENERATION TERMINAL AND A BASE STATION FOR SEQUENCE GENERATION

CROSS-REFERENCE TO RELATED APPLICATIONS

This application is a continuation of International Application No. PCT/CN2014/078246, filed on May 23, 2014, the disclosure of which is hereby incorporated by reference in its entirety.

TECHNICAL FIELD

The present invention relates to the communications field, and in particular, to a sequence generation method and a terminal and a base station for sequence generation.

BACKGROUND

In an LTE (Long Term Evolution) system, there are six standard system bandwidths in total: 1.4 MHz, 3 MHz, 5 MHz, 10 MHz, 15 MHz, and 20 MHz, as shown in FIG. 1. A sequence such as an RS (Reference Signal) sequence or a scrambling code sequence is generated according to a maximum system bandwidth. For example, a sequence is generated according to a sequence length needed by 20 MHz. Then, a corresponding sequence is clipped out of the center of the sequence according to an actual system bandwidth, and the corresponding sequence is used as a sequence to be actually used. As shown in FIG. 2, mapping from a sequence to a frequency domain is performed by extending from a center frequency to two sides.

In an LTE system, a sequence is generated according to the following formula:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots 2N_{RB}^{max,DL} - 1,$$

where
  $n_s$ is a timeslot number in a radio frame, 1 is a number of an OFDM (Orthogonal Frequency Division Multiplexing) symbol in a timeslot, c(i) is a pseudo-random sequence, and when a sequence is generated, an initialization status of a pseudo-random sequence generator may be used to distinguish sequences, for example:

$c_{init}=2^{10} \cdot (7 \cdot (n_s+1)+1+1) \cdot (2 \cdot N_{ID}^{cell}+1)+2 \cdot N_{ID}^{cell}+N_{CP}$,
    where $N_{CP}$ is one in a case of a normal CP (Cyclic Prefix), and $N_{CP}$ is zero in a case of an extended CP; and
  c(2m) is generated according to the following formula:

$c(n)=(x_1(n+N_c)+x_2(n+N_c))\mod 2$ $x_1(n+31)=(x_1(n+3)+x_1(n))\mod 2$ $x_2(n+31)=(x_2(n+3)+x_2(n+2)+x_2(n+1)+x_2(n))\mod 2$,
    where $N_c$ is a constant.

Sequences such as a scrambling code sequence and a pilot sequence are all generated in the manner of generating a pseudo-random sequence.

For the manner of generating a sequence according to a maximum system bandwidth and clipping a sequence, when the maximum system bandwidth is far greater than a bandwidth to be actually used, a sequence length to be actually used is far less than a sequence length that needs to be generated, which results in low sequence generation efficiency, wastes computing resources, and causes high energy consumption. This problem is more obvious when a system bandwidth exceeds 20 M.

SUMMARY

In view of this, the present invention provides a sequence generation method and a terminal and a base station for sequence generation, to reduce sequence generation complexity.

According to a first aspect, a sequence generation method is provided, where the method provides:
  determining, by a terminal, at least one first sequence according to at least one candidate sequence, where a length of the candidate sequence is less than a sequence length corresponding to a maximum available system bandwidth; and
  connecting the at least one first sequence to generate a second sequence or directly using the at least one first sequence as a second sequence, and receiving a signal according to the second sequence, where the second sequence is at least one of a reference signal sequence or a scrambling code sequence.

With reference to the implementation manner of the first aspect, in a first possible implementation manner, each first sequence of the at least one first sequence is a candidate sequence of the at least one candidate sequence or a sub-sequence of a candidate sequence of the at least one candidate sequence, and the sub-sequence is a part of the candidate sequence.

With reference to the first aspect or the first possible implementation manner of the first aspect, in a second possible implementation manner, the connecting the at least one first sequence to generate a second sequence includes:
  connecting at least two first sequences to generate the second sequence.

With reference to the first aspect or the first possible implementation manner of the first aspect, in a third possible implementation manner, the connecting the at least one first sequence to generate a second sequence includes:
  determining at least one third sequence, where the third sequence is a predefined sequence or a sequence that is determined according to a preconfigured identifier; and
  connecting the at least one first sequence and the at least one third sequence, to obtain the second sequence.

With reference to the first possible implementation manner, the second possible implementation manner, or the third possible implementation manner of the first aspect, in a fourth possible implementation manner, the length of the candidate sequence is preset or configured by a base station or selected by the terminal.

With reference to the first possible implementation manner, the second possible implementation manner, or the third possible implementation manner of the first aspect, in a fifth possible implementation manner, when the candidate sequence includes at least two candidate sequences, the two candidate sequences are different, or when the first sequence includes at least two first sequences, the at least two first sequences are different.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner, the method further includes:

obtaining, by the terminal, a sequence number, where the sequence number is used to generate an initialization status value of a sequence generator; and generating the at least one candidate sequence by using the sequence number.

With reference to the sixth possible implementation manner of the first aspect, in a seventh possible implementation manner, the step of obtaining, by the terminal, a sequence number includes:

detecting, by the terminal, an access pilot of a frequency band that is used for access; and obtaining, by the terminal according to a detection result of the access pilot, the sequence number of at least one other frequency band except the frequency band that is used for access; or receiving, by the terminal, control signaling according to the access pilot, where the control signaling includes configuration information of a pilot sequence in at least one other frequency band except the frequency band that is used for access, and obtaining, by the terminal according to the configuration information of the pilot sequence, the sequence number of the at least one other frequency band except the frequency band that is used for access; or receiving, by the terminal, control signaling sent by the base station, where the control signaling includes information about at least one sequence number and/or information about a manner of forming the second sequence.

With reference to the seventh possible implementation manner of the first aspect, in an eighth possible implementation manner, the step of obtaining, by the terminal according to a detection result of the access pilot, the sequence number of at least one other frequency band except the frequency band that is used for access includes: determining, by the terminal, the sequence number of the at least one other frequency band according to sequence configuration information that is of the at least one other frequency band and that is carried in the pilot, and/or a sequence relationship or a frequency band location relationship between the frequency band that is used for access and the at least one other frequency band.

With reference to the sixth possible implementation manner, the seventh possible implementation manner, or the eighth possible implementation manner of the first aspect, in a ninth possible implementation manner, the sequence number is an absolute number or a relative number.

With reference to the ninth possible implementation manner of the first aspect, in a tenth possible implementation manner, the absolute number is an absolute frequency domain location number, or the relative number is a relative frequency domain location number.

With reference to the sixth possible implementation manner, the seventh possible implementation manner, the eighth possible implementation manner, the ninth possible implementation manner, or the tenth possible implementation manner of the first aspect, in an eleventh possible implementation manner, the generating the at least one candidate sequence by using the sequence number includes:

generating, by the terminal, a corresponding quantity of candidate sequences according to the at least one sequence number; or generating, by the terminal, one candidate sequence according to one sequence number, and generating another candidate sequence according to a relative location of the at least one candidate sequence that is generated according to the sequence number.

With reference to the sixth possible implementation manner, the seventh possible implementation manner, the eighth possible implementation manner, the ninth possible implementation manner, or the tenth possible implementation manner of the first aspect, in a twelfth possible implementation manner, the generating the at least one candidate sequence by using the sequence number includes:

generating, according to the following formula by using the sequence number, an initialization status value that is of a sequence generator and that corresponds to the candidate sequence:

$$c_{init}=2^{10}\cdot(7\cdot(n_s+1)+1+1)\cdot(2\cdot N_{ID}^{seq}+1)+2\cdot N_{ID}^{cell}+N_{CP},$$
or $$c_{init}=2^{10}\cdot(7\cdot(n_s+1)+1+1)\cdot(2\cdot N_{ID}^{cell}+1)+2\cdot N_{ID}^{seq}+N_{CP},$$
or $$c_{init}=2^{10}\cdot(7\cdot(n_s+1)+1+1)\cdot(2\cdot N_{ID}^{seq}+1)+2\cdot N_{ID}^{seq}+N_{CP},$$
where $c_{init}$ is the initialization status value that is of the sequence generator and that corresponds to the at least one candidate sequence, $n_s$ is a timeslot number, 1 is a number of an OFDM symbol in a timeslot, $B_{ID}^{seq}$ is the sequence number, $N_{ID}^{cell}$ is a cell number, and $N_{CP}$ is one in a case of a normal CP and $N_{CP}$ is zero in a case of an extended CP; and generating the candidate sequence according to the initialization status value.

With reference to the fourth possible implementation manner of the first aspect, in a thirteenth possible implementation manner, parameters corresponding to the at least two first sequences are the same or different, and the parameters include at least one of sequence lengths, sequence numbers, or transmit power.

With reference to the implementation manner of the first aspect, in a fourteenth possible implementation manner, a frequency band corresponding to the at least one candidate sequence includes a direct current subcarrier.

According to a second aspect, a sequence generation method is provided, where the method includes: determining, by a base station, at least one first sequence according to at least one candidate sequence, where a length of the candidate sequence is less than a sequence length corresponding to a maximum available system bandwidth; and connecting the at least one first sequence to generate a second sequence or directly using the at least one first sequence as a second sequence, and sending a signal according to the second sequence, where the second sequence is at least one of a reference signal sequence or a scrambling code sequence.

With reference to the implementation manner of the second aspect, in a first possible implementation manner, each first sequence of the at least one first sequence is a candidate sequence of the at least one candidate sequence or a sub-sequence of a candidate sequence of the at least one candidate sequence, and the sub-sequence is a part of the candidate sequence.

With reference to the second aspect or the first possible implementation manner of the second aspect, in a second possible implementation manner, the connecting the at least one first sequence to generate a second sequence includes: connecting at least two first sequences to generate the second sequence.

With reference to the second aspect or the first possible implementation manner of the second aspect, in a third possible implementation manner, the connecting the at least one first sequence to generate a second sequence includes:
determining at least one third sequence, where the third sequence is a predefined sequence or a sequence that is determined according to a preconfigured identifier; and
connecting the at least one first sequence and the at least one third sequence, to obtain the second sequence.

With reference to the first possible implementation manner, the second possible implementation manner, or the third possible implementation manner of the second aspect, in a fourth possible implementation manner, the length of the candidate sequence is preset or selected by the base station or configured by a network control node.

With reference to the first possible implementation manner, the second possible implementation manner, or the third possible implementation manner of the second aspect, in a fifth possible implementation manner, when the candidate sequence includes at least two candidate sequences, the two candidate sequences are different, or when the first sequence includes at least two first sequences, the at least two first sequences are different.

With reference to the second aspect, or the first possible implementation manner, the second possible implementation manner, the third possible implementation manner, the fourth possible implementation manner, or the fifth possible implementation manner of the second aspect, in a sixth possible implementation manner, the method further includes:
obtaining, by the base station, a sequence number, where the sequence number is used to generate an initialization status value of a sequence generator; and
generating the at least one candidate sequence by using the sequence number.

With reference to the sixth possible implementation manner of the second aspect, in a seventh possible implementation manner, the step of obtaining, by the base station, a sequence number includes:
determining, by the base station, an access pilot of a frequency band that is used for access; and
determining, by the base station, the sequence number of the at least one other frequency band according to a sequence relationship or a frequency band location relationship between the frequency band that is used for access and the at least one other frequency band.

With reference to the seventh possible implementation manner of the second aspect, in an eighth possible implementation manner, the step of determining, by the base station, the sequence number of the at least one other frequency band according to a sequence relationship or a frequency band location relationship between the frequency band that is used for access and the at least one other frequency band further includes:
transmitting, by the base station to a terminal, the access pilot that carries sequence configuration information of the at least one other frequency band; or indicating, by the base station to a terminal by using control signaling, configuration information of a pilot sequence in the at least one other frequency band except the frequency band that is used for access.

With reference to the sixth possible implementation manner, the seventh possible implementation manner, or the eighth possible implementation manner of the second aspect, in a ninth possible implementation manner, the sequence number is an absolute number or a relative number.

With reference to the ninth possible implementation manner of the second aspect, in a tenth possible implementation manner, the absolute number is an absolute frequency domain location number, or the relative number is a relative frequency domain location number.

With reference to the sixth possible implementation manner, the seventh possible implementation manner, the eighth possible implementation manner, the ninth possible implementation manner, or the tenth possible implementation manner of the second aspect, in an eleventh possible implementation manner, the generating the at least one candidate sequence by using the sequence number includes:
generating, by the base station, a corresponding quantity of candidate sequences according to the at least one sequence number; or
generating, by the base station, one candidate sequence according to one sequence number, and generating another candidate sequence according to a relative location of the at least one candidate sequence that is generated according to the sequence number.

With reference to the sixth possible implementation manner, the seventh possible implementation manner, the eighth possible implementation manner, the ninth possible implementation manner, or the tenth possible implementation manner of the second aspect, in a twelfth possible implementation manner, the generating the at least one candidate sequence by using the sequence number includes:
generating, according to the following formula by using the sequence number, an initialization status value that is of a sequence generator and that corresponds to the candidate sequence:

$$c_{init}=2^{10}\cdot(7\cdot(n_s+1)+1+1)\cdot(2\cdot N_{ID}^{seq}+1)+2\cdot N_{ID}^{cell}+N_{CP},$$
or
$$c_{init}=2^{10}\cdot(7\cdot(n_s+1)+1+1)\cdot(2\cdot N_{ID}^{cell}+1)+2\cdot N_{ID}^{seq}+N_{CP},$$
or
$$c_{init}=2^{10}\cdot(7\cdot(n_s+1)+1+1)\cdot(2\cdot N_{ID}^{seq}+1)+2\cdot N_{ID}^{seq}+N_{CP},$$
where $c_{init}$ is the initialization status value that is of the sequence generator and that corresponds to the at least one candidate sequence, $n_s$ is a timeslot number, 1 is a number of an OFDM symbol in a timeslot, $N_{ID}^{seq}$ is the sequence number, $N_{ID}^{cell}$ is a cell number, and $N_{CP}$ is one in a case of a normal CP and $N_{CP}$ is zero in a case of an extended CP; and
generating the candidate sequence according to the initialization status value.

With reference to the fourth possible implementation manner of the second aspect, in a thirteenth possible implementation manner, parameters corresponding to the at least two first sequences are the same or different, and the parameters include at least one of sequence lengths, sequence numbers, or transmit power.

With reference to the implementation manner of the second aspect, in a fourteenth possible implementation manner, a frequency band corresponding to the at least one candidate sequence includes a direct current subcarrier.

According to a third aspect, a terminal for sequence generation is provided, including: a first determining module, configured to determine at least one first sequence according to at least one candidate sequence, where a length of the candidate sequence is less than a sequence length corresponding to a maximum available system bandwidth; and a first generation module, connected to the first determining module, and configured to connect the at least one first sequence to generate a second sequence or directly use the at least one first sequence as a second sequence, and receive a signal according to the second sequence, where the second sequence is at least one of a reference signal sequence or a scrambling code sequence.

With reference to the implementation manner of the third aspect, in a first possible implementation manner, each first sequence of the at least one first sequence is a candidate sequence of the at least one candidate sequence or a subsequence of a candidate sequence of the at least one candidate sequence, and the sub-sequence is a part of the candidate sequence.

With reference to the third aspect or the first possible implementation manner of the third aspect, in a second possible implementation manner, the first connection and generation module is further configured to connect at least two first sequences to generate the second sequence.

With reference to the third aspect or the first possible implementation manner of the third aspect, in a third possible implementation manner, the first connection and generation module is further configured to:
determine at least one third sequence, where the third sequence is a predefined sequence or a sequence that is determined according to a preconfigured identifier; and
connect the at least one first sequence and the at least one third sequence, to obtain the second sequence.

With reference to the first possible implementation manner, the second possible implementation manner, or the third possible implementation manner of the third aspect, in a fourth possible implementation manner, the length of the candidate sequence is preset or configured by a base station or selected by the terminal.

With reference to the first possible implementation manner, the second possible implementation manner, or the third possible implementation manner of the third aspect, in a fifth possible implementation manner, when the candidate sequence includes at least two candidate sequences, the two candidate sequences are different, or when the first sequence includes at least two first sequences, the at least two first sequences are different.

With reference to the third aspect, or the first possible implementation manner, the second possible implementation manner, the third possible implementation manner, the fourth possible implementation manner, or the fifth possible implementation manner of the third aspect, in a sixth possible implementation manner, the first determining module is further configured to:
obtain a sequence number, where the sequence number is used to generate an initialization status value of a sequence generator; and
generate the at least one candidate sequence by using the sequence number.

With reference to the third aspect, or the first possible implementation manner, the second possible implementation manner, the third possible implementation manner, the fourth possible implementation manner, the fifth possible implementation manner, or the sixth possible implementation manner of the third aspect, in a seventh possible implementation manner, the first determining module is further configured to:
detect an access pilot of a frequency band that is used for access; and obtain, according to a detection result of the access pilot, the sequence number of at least one other frequency band except the frequency band that is used for access; or receive control signaling according to the access pilot, where the control signaling includes configuration information of a pilot sequence in at least one other frequency band except the frequency band that is used for access, and obtain, according to the configuration information of the pilot sequence, the sequence number of the at least one other frequency band except the frequency band that is used for access; or receive, by the terminal, control signaling sent by the base station, where the control signaling includes information about at least one sequence number and/or information about a manner of forming the second sequence.

With reference to the seventh possible implementation manner of the third aspect, in an eighth possible implementation manner, the first determining module is further configured to:
determine the sequence number of the at least one other frequency band according to sequence configuration information that is of the at least one other frequency band and that is carried in the access pilot, and/or a sequence relationship or a frequency band location relationship between the frequency band that is used for access and the at least one other frequency band.

With reference to the sixth possible implementation manner, the seventh possible implementation manner, or the eighth possible implementation manner of the third aspect, in a ninth possible implementation manner, the sequence number is an absolute number or a relative number.

With reference to the ninth possible implementation manner of the third aspect, in a tenth possible implementation manner, the absolute number is an absolute frequency domain location number, or the relative number is a relative frequency domain location number.

With reference to the sixth possible implementation manner, the seventh possible implementation manner, the eighth possible implementation manner, the ninth possible implementation manner, or the tenth possible implementation manner of the third aspect, in an eleventh possible implementation manner, the first determining module is further configured to:
generate a corresponding quantity of candidate sequences according to the at least one sequence number; or
generate one candidate sequence according to one sequence number, and generate another candidate sequence according to a relative location of the at least one candidate sequence that is generated according to the sequence number.

With reference to the sixth possible implementation manner, the seventh possible implementation manner, the eighth possible implementation manner, the ninth possible implementation manner, or the tenth possible implementation manner of the third aspect, in a twelfth possible implementation manner, the first determining module is further configured to:
generate, according to the following formula by using the sequence number, an initialization status value that is of a sequence generator and that corresponds to the candidate sequence:

$$c_{init}=2^{10}\cdot(7\cdot(n_s+1)+1+1)\cdot(2\cdot N_{ID}^{seq}+1)+2\cdot N_{ID}^{cell}+N_{CP},$$
or $$c_{init}=2^{10}\cdot(7\cdot(n_s+1)+1+1)\cdot(2\cdot N_{ID}^{cell}+1)+2\cdot N_{ID}^{seq}+N_{CP},$$
or $$c_{init}=2^{10}\cdot(7\cdot(n_s+1)+1+1)\cdot(2\cdot N_{ID}^{seq}+1)+2\cdot N_{ID}^{seq}+N_{CP},$$

where $c_{init}$ is the initialization status value that is of the sequence generator and that corresponds to the at least one candidate sequence, $n_s$ is a timeslot number, 1 is a number of an OFDM symbol in a timeslot, $N_{ID}^{seq}$ is the sequence number, $N_{ID}^{cell}$ is a cell number, and $N_{CP}$ is one in a case of a normal CP and $N_{CP}$ is zero in a case of an extended CP; and generate the candidate sequence according to the initialization status value.

With reference to the fourth possible implementation manner of the third aspect, in a thirteenth possible implementation manner, parameters corresponding to the at least two first sequences are the same or different, and the parameters include at least one of sequence lengths, sequence numbers, or transmit power.

With reference to the implementation manner of the third aspect, in a fourteenth possible implementation manner, a frequency band corresponding to the at least one candidate sequence includes a direct current subcarrier.

According to a fourth aspect, a base station for sequence generation is provided, including: a second determining module, configured to determine at least one first sequence according to at least one candidate sequence, where a length of the candidate sequence is less than a sequence length corresponding to a maximum available system bandwidth; and a second generation module, connected to the second determining module, and configured to connect the at least one first sequence to generate a second sequence or directly use the at least one first sequence as a second sequence, and send a signal according to the second sequence, where the second sequence is at least one of a reference signal sequence or a scrambling code sequence.

With reference to the implementation manner of the fourth aspect, in a first possible implementation manner, each first sequence of the at least one first sequence is a candidate sequence of the at least one candidate sequence or a sub-sequence of a candidate sequence of the at least one candidate sequence, and the sub-sequence is a part of the candidate sequence.

With reference to the fourth aspect or the first possible implementation manner of the fourth aspect, in a second possible implementation manner, the second generation module is further configured to connect at least two first sequences to generate the second sequence.

With reference to the fourth aspect or the first possible implementation manner of the fourth aspect, in a third possible implementation manner, the second generation module is further configured to:

determine at least one third sequence, where the third sequence is a predefined sequence or a sequence that is determined according to a preconfigured identifier; and
connect the at least one first sequence and the at least one third sequence, to obtain the second sequence.

With reference to the first possible implementation manner, the second possible implementation manner, or the third possible implementation manner of the fourth aspect, in a fourth possible implementation manner, the length of the candidate sequence is preset or selected by the base station or configured by a network control node.

With reference to the first possible implementation manner, the second possible implementation manner, or the third possible implementation manner of the fourth aspect, in a fifth possible implementation manner, when the candidate sequence includes at least two candidate sequences, the two candidate sequences are different, or when the first sequence includes at least two first sequences, the at least two first sequences are different.

With reference to the fourth aspect, or the first possible implementation manner, the second possible implementation manner, the third possible implementation manner, the fourth possible implementation manner, or the fifth possible implementation manner of the fourth aspect, in a sixth possible implementation manner, the second determining module is further configured to:

obtain a sequence number, where the sequence number is used to generate an initialization status value of a sequence generator; and
generate the at least one candidate sequence by using the sequence number.

With reference to the sixth possible implementation manner of the fourth aspect, in a seventh possible implementation manner, the second determining module is further configured to:

determine an access pilot of a frequency band that is used for access; and
determine the sequence number of the at least one other frequency band according to a sequence relationship or a frequency band location relationship between the frequency band that is used for access and the at least one other frequency band.

With reference to the seventh possible implementation manner of the fourth aspect, in an eighth possible implementation manner, the base station further includes a transmission module, configured to:

transmit, to a terminal, the access pilot that carries sequence configuration information of the at least one other frequency band; or indicate, to a terminal by using control signaling, configuration information of a pilot sequence in the at least one other frequency band except the frequency band that is used for access.

With reference to the sixth possible implementation manner, the seventh possible implementation manner, or the eighth possible implementation manner of the fourth aspect, in a ninth possible implementation manner, the sequence number is an absolute number or a relative number.

With reference to the ninth possible implementation manner of the fourth aspect, in a tenth possible implementation manner, the absolute number is an absolute frequency domain location number, or the relative number is a relative frequency domain location number.

With reference to the sixth possible implementation manner, the seventh possible implementation manner, the eighth possible implementation manner, the ninth possible implementation manner, or the tenth possible implementation manner of the fourth aspect, in an eleventh possible implementation manner, the second determining module is further configured to:

generate a corresponding quantity of candidate sequences according to the at least one sequence number; or
generate one candidate sequence according to one sequence number, and generate another candidate sequence according to a relative location of the at least one candidate sequence that is generated according to the sequence number.

With reference to the sixth possible implementation manner, the seventh possible implementation manner, the eighth possible implementation manner, the ninth possible implementation manner, or the tenth possible implementation manner of the fourth aspect, in a twelfth possible implementation manner, the second determining module is further configured to generate, according to the following formula by using the sequence number, an initialization status value that is of a sequence generator and that corresponds to the candidate sequence:

$$c_{init}=2^{10}\cdot(7\cdot(n_s+1)+1+1)\cdot(2\cdot N_{ID}^{seq}+1)+2\cdot N_{ID}^{cell}+N_{CP},$$

or $$c_{init}=2^{10}\cdot(7\cdot(n_s+1)+1+1)\cdot(2\cdot N_{ID}^{cell}+1)+2\cdot N_{ID}^{seq}+N_{CP},$$

or $$c_{init}=2^{10}\cdot(7\cdot(n_s+1)+1+1)\cdot(2\cdot N_{ID}^{seq}+1)+2\cdot N_{ID}^{seq}+N_{CP},$$

where $c_{init}$ is the initialization status value that is of the sequence generator and that corresponds to the at least one candidate sequence, $n_s$ is a timeslot number, 1 is a number of an OFDM symbol in a timeslot, $N_{ID}^{seq}$ is the sequence number, $N_{ID}^{cell}$ is a cell number, and $N_{CP}$ is one in a case of a normal CP and $N_{CP}$ is zero in a case of an extended CP; and generate the candidate sequence according to the initialization status value.

With reference to the fourth possible implementation manner of the fourth aspect, in a thirteenth possible implementation manner, parameters corresponding to the at least two first sequences are the same or different, and the parameters include at least one of sequence lengths, sequence numbers, or transmit power.

With reference to the implementation manner of the fourth aspect, in a fourteenth possible implementation manner, a frequency band corresponding to the at least one candidate sequence includes a direct current subcarrier.

According to the foregoing solutions, beneficial effects of the present invention are: In the present invention, a terminal determines at least one first sequence according to at least one candidate sequence, where a length of the candidate sequence is less than a sequence length corresponding to a maximum available system bandwidth; and connects the at least one first sequence to generate a second sequence or directly uses the at least one first sequence as a second sequence, and receives a signal according to the second sequence, where the second sequence is at least one of a reference signal sequence or a scrambling code sequence. Therefore, instead of according to a maximum system bandwidth, the terminal and/or a base station can effectively obtain, by means of connection, or directly obtain a sequence to be actually used, that is, the second sequence. Therefore, sequence generation is more efficient and is less complex, and causes less energy consumption. Moreover, massive computation required when a sequence is generated according to the maximum system bandwidth in the prior art can be avoided, which can reduce computing resources.

BRIEF DESCRIPTION OF DRAWINGS

To describe the technical solutions in embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
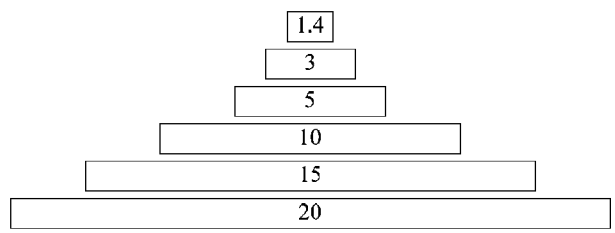
FIG. 1 is a schematic diagram of six standard system bandwidths in the prior art.
Figure 2:
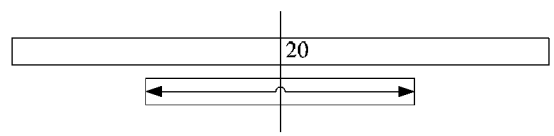
FIG. 2 is a schematic diagram of mapping from a sequence to a frequency domain in the prior art.
Figure 3:
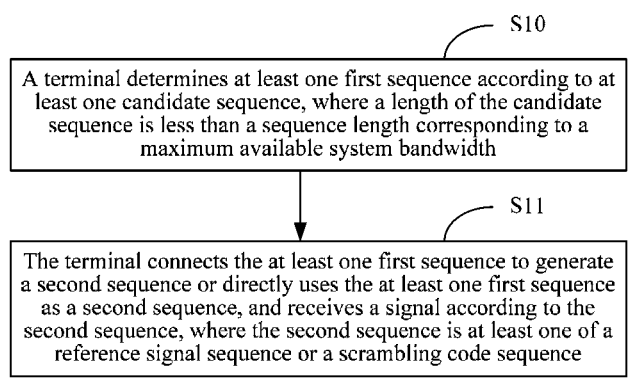
FIG. 3 is a schematic flowchart of a sequence generation method according to a first embodiment of the present invention.

Referring to FIG. 3, FIG. 3 is a schematic flowchart of a sequence generation method according to a first embodiment of the present invention. As shown in FIG. 3, the sequence generation method includes:

S10: A terminal determines at least one first sequence according to at least one candidate sequence, where a length of the candidate sequence is less than a sequence length corresponding to a maximum available system bandwidth.

The candidate sequence may be generated according to a predefined length or a length that is configured by a base station or selected by the terminal. In a case in which the base station performs configuration, the base station controls the length of the candidate sequence, which is used on, for example, a cellular network. In a case in which the terminal selects a length, the terminal controls the length of the candidate sequence, which is used in, for example, a direct connection between terminals. A length approximate to a length corresponding to an access bandwidth of the terminal and/or a bandwidth in which a network provides a service for the terminal may be selected as the length of the candidate sequence, or a length approximate to a length corresponding to a sub-bandwidth of an access bandwidth of the terminal and/or a bandwidth in which a network provides a service for the terminal may be selected as the length of the candidate sequence, that is, the length of the candidate sequence is approximate to a sequence length corresponding to a bandwidth used by the terminal. Optionally, the length of the candidate sequence is less than or equal to a first length threshold. The first length threshold herein may be a sequence length corresponding to a total used bandwidth that is of a serving base station or a serving cell and that includes a bandwidth that serves the terminal.

S11: The terminal connects the at least one first sequence to generate a second sequence or directly uses the at least one first sequence as a second sequence, and receives a signal according to the second sequence, where the second sequence is at least one of a reference signal sequence or a scrambling code sequence.

Specifically, in S11, the terminal may connect the at least one first sequence to generate the second sequence or directly use the at least one first sequence as the second sequence in the following three cases: a) The terminal connects the at least one first sequence to obtain the second sequence. In this case, a length of the second sequence is greater than a length of the first sequence. b) The terminal selects a first sequence from the at least one first sequence, and directly uses the selected first sequence as the second sequence. c) When a bandwidth used by the terminal is less than or equal to a frequency band corresponding to the candidate sequence, the terminal selects a sequence from the candidate sequence and uses the sequence as the second sequence; or when a bandwidth used by the terminal is greater than a frequency band corresponding to the candidate sequence, the terminal connects the at least one first sequence to generate the second sequence. In this case, a length of the second sequence is greater than a length of the first sequence. When the terminal connects the at least one first sequence to obtain the second sequence, the terminal connects the at least one first sequence according to a location order, to form the second sequence, and then maps the second sequence to a time-frequency resource.

In this embodiment, the terminal determines the at least one first sequence according to the at least one candidate sequence, where the length of the candidate sequence is less than the sequence length corresponding to the maximum available system bandwidth; and connects the at least one first sequence to generate the second sequence or directly uses the at least one first sequence as the second sequence, and receives a signal according to the second sequence, where the second sequence is at least one of a reference signal sequence or a scrambling code sequence. Therefore, on the basis that only several sequences or even a short sequence is generated, the terminal can generate, by means of connection, a sequence to be actually used or directly use the sequences or the short sequence as a sequence to be actually used. In addition, optionally, instead of generating a sequence according to a total used bandwidth or a maximum system bandwidth that is of a serving base station or a serving cell and that includes a bandwidth that serves the terminal, the terminal can effectively obtain, according to a bandwidth in which a network provides a service for the terminal, a sequence to be actually used, that is, a second sequence. Therefore, sequence generation is more efficient and is less complex, and causes less energy consumption. Moreover, massive computation required when a sequence is generated according to the maximum system bandwidth can be avoided, which can reduce computing resources.

When an eNB (evolved Node B) uses a non-standard bandwidth, or uses a high bandwidth such as 100 MHz, and a serving frequency band accessed by the terminal is only any part of a frequency band used by the eNB, the terminal may know only an access bandwidth of the terminal and/or a service bandwidth in which a network provides a service for the terminal, and may not know a bandwidth used by the eNB, and in this case, according to the sequence generation manner in the prior art, sequence generation for the terminal is less efficient and is more complex, which wastes computing resources and causes more energy consumption. Therefore, when a service bandwidth of the terminal is far less than a total used bandwidth or a maximum system bandwidth of a serving base station or a serving cell, and the terminal does not know the total used bandwidth or the maximum system bandwidth of the serving base station or the serving cell, beneficial effects of the present invention are especially obvious: Sequence generation is more efficient and is less complex, and causes less energy consumption. Moreover, massive computation required when a sequence is generated according to the maximum system bandwidth can be avoided, which can reduce computing resources.

Moreover, according to this embodiment of the present invention, sequences are mapped to different frequency bands more flexibly, which can therefore flexibly adapt to various different manners of using a frequency band by the terminal and the base station.

In a more specific embodiment, in S10, each first sequence of the at least one first sequence is a candidate sequence of the at least one candidate sequence or a sub-sequence of a candidate sequence of the at least one candidate sequence, and the sub-sequence is a part of the candidate sequence. When the candidate sequence includes at least two candidate sequences, the two candidate sequences are different, or when the first sequence includes at least two first sequences, the at least two first sequences are different; and candidate sequences or sub-sequences separately corresponding to the at least two first sequences are the same or different.

Figure 4:
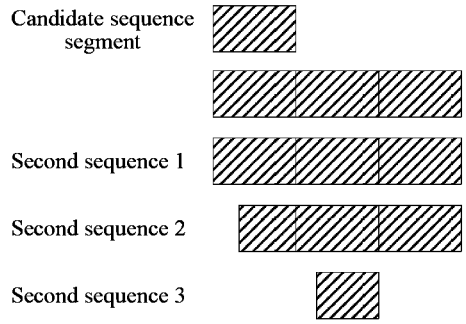
FIG. 4 is a schematic diagram of a sequence generation method for one candidate sequence according to a first embodiment of the present invention.

As shown in FIG. 4, a first sequence is determined according to a candidate sequence. It is determined that the first sequence is the candidate sequence, for example, a second sequence 1. It is determined that the first sequence is the candidate sequence or the sub-sequence of the candidate sequence, for example, a second sequence 2, where when the first sequence is a sub-sequence of the candidate sequence, the first sequence is a part of the second sequence, and is at the head and/or tail and/or middle location of the second sequence. It is determined that the first sequence is a sub-sequence of the candidate sequence, for example, a second sequence 3.

Figure 5:
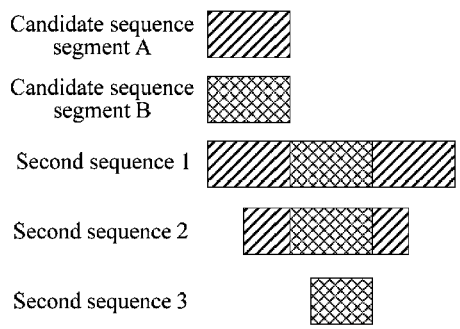
FIG. 5 is a schematic diagram of a sequence generation method for two candidate sequences according to a first embodiment of the present invention.

As shown in FIG. 5, a first sequence is determined according to two candidate sequences A and B. It is determined that the first sequence is the candidate sequence A and/or the candidate sequence B, for example, a second sequence 1. It is determined that the first sequence is the candidate sequence A and/or the candidate sequence B and a sub-sequence of one or two candidate sequences A and/or candidate sequences B, where when the first sequence is a sub-sequence of a candidate sequence, the first sequence is a part of the second sequence, and is at the head and/or tail and/or middle location of the second sequence, for example, a second sequence 2. It is determined that the first sequence is a sub-sequence of the candidate sequence A and/or the candidate sequence B, for example, a second sequence 3.

Figure 6:
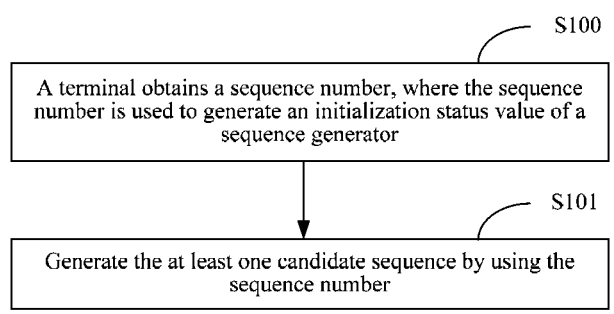
FIG. 6 is a schematic flowchart of a sequence generation method according to a second embodiment of the present invention.

In this embodiment of the present invention, as shown in FIG. 6, S10 includes:

S100: The terminal obtains a sequence number, where the sequence number is used to generate an initialization status value of a sequence generator.

The terminal may obtain the sequence number according to presetting or a configuration received from the base station or according to an identifier corresponding to the terminal.

In S100, the terminal detects an access pilot of a frequency band that is used for access; and the terminal obtains, according to a detection result of the access pilot, the sequence number of at least one other frequency band except the frequency band that is used for access; or the terminal receives control signaling according to the access pilot, where the control signaling includes configuration information of a pilot sequence in at least one other frequency band except the frequency band that is used for access, and the terminal obtains, according to the configuration information of the pilot sequence, the sequence number of the at least one other frequency band except the frequency band that is used for access, where the configuration information of the pilot sequence includes the sequence number of the at least one other frequency band except the frequency band that is used for access. Alternatively, the terminal receives control signaling sent by the base station, where the control signaling includes information about at least one sequence number and/or information about a manner of forming the second sequence. The obtaining, according to a detection result of the access pilot, the sequence number of at least one other frequency band except the frequency band that is used for access includes: determining, by the terminal, the sequence number of the at least one other frequency band according to sequence configuration information that is of the at least one other frequency band and that is carried in the access pilot, and/or a sequence relationship or a frequency band location relationship between the frequency band that is used for access and the at least one other frequency band. The sequence relationship between the frequency band that is used for access and the at least one other frequency band may be predefined, for example, a sequence segment number of the frequency band that is used for access and a sequence segment number of a sequence of the at least one other frequency band are in a progressive increase relationship according to locations of sequence segments in the second sequence, for example, a progressive increase step is 1, 2, 3, or the like.

The candidate sequence is generated according to a predefined length or a configured length or a length selected by the terminal. The length of the candidate sequence may be L, and a length of L is less than or equal to a first length threshold. The first length threshold may be a pilot sequence length corresponding to a system bandwidth of 20 MHz, 100 MHz or 1000 MHz. For example, L may be equal to N*M, where M is a maximum value of a quantity of RBs (Resource Block) covered by one candidate sequence, and N is a quantity of sequence elements corresponding to each RB of each symbol. For example, if N=2 and M=15, the length of the candidate sequence is 30, and each candidate sequence may cover a maximum of 15 RBs. Lengths of different candidate sequences may be different, for example, a length of a candidate sequence A is 30, and a length of a candidate sequence B is 60. In this way, a sequence whose length is more approximate to or shorter than that corresponding to an access bandwidth of the terminal and/or a bandwidth in which a network provides a service for the terminal may be more flexibly selected to form a pilot sequence that can be seen by the terminal. Therefore, sequence generation is more efficient and is less complex, and causes less energy consumption. Moreover, massive computation required when a sequence is generated according to a maximum system bandwidth can be avoided, which can reduce computing resources.

S101: Generate the at least one candidate sequence by using the sequence number.

In S101, the terminal generates a corresponding quantity of candidate sequences according to the at least one sequence number; or the terminal generates one candidate sequence according to one sequence number, and generates another candidate sequence according to a relative location of the at least one candidate sequence that is generated according to the sequence number. In the present invention, a manner of generating a candidate sequence may be controlled by the base station, for example, selection of the foregoing two manners of generating a candidate sequence may be controlled by the base station.

Figure 7:
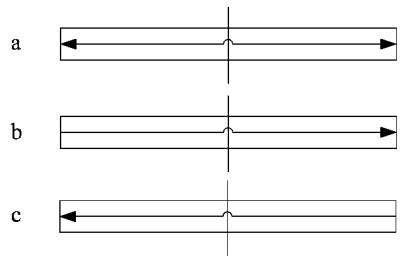
FIG. 7 is a schematic diagram of a sequence generation method for a candidate sequence according to a first embodiment of the present invention.

In this embodiment of the present invention, the second sequence is mapped to a frequency band in which the terminal receives a signal of the base station. The second sequence includes but is not limited to at least one of the following: a CRS (Cell-specific Reference Signal), a CSI-RS (Channel State Indication RS), a DL DM RS (Downlink Demodulation Reference Signal), a DRS (Demodulation Reference Signal), a PRS (Positioning Reference Signal), an SRS (Sounding Reference Signal), or an MBSFN RS (Multimedia Broadcast Single Frequency Network Reference Signal). Each candidate sequence is generated independently. A mapping manner of the candidate sequence in a transmission bandwidth may be shown in FIG. 7. For each candidate sequence, mapping may be performed in a manner of extending from the center of a transmission bandwidth to two sides of the transmission bandwidth, as shown by a in FIG. 7; or for each candidate sequence, mapping may be performed in a manner of extending from one edge of a transmission bandwidth to the other edge of the transmission bandwidth, which includes extending from the left edge to the right edge shown by b in FIG. 7, or extending from the right edge to the left edge shown by c in FIG. 7. When there is more than one candidate sequence, although lengths of two candidate sequences are the same, the sequences may also be different.

Specifically, the terminal may generate a candidate sequence in the following cases:

1) The terminal performs blind detection to detect a pilot such as a CRS of a first frequency band that is used for access, obtains control signaling (for example, a PBCH, Physical Broadcast Channel) according to the pilot, where the control signaling includes configuration information of a pilot sequence in at least one other frequency band in a service frequency band, and obtains a candidate sequence in the at least one other frequency band according to the configuration information of the pilot sequence. A candidate sequence in a frequency band that may be accessed by the terminal is known by the terminal in advance, for example, the candidate sequence is predefined or bound to a cell identifier, or may be obtained by using another signal such as a synchronization signal PSS/SSS or a discovery pilot DRS sent by the base station.

2) The terminal performs blind detection to detect a pilot such as a DRS of a first frequency band that is used for access, and determines a candidate sequence in another frequency band according to a relationship between the candidate sequence in the another frequency band and a candidate sequence in the frequency band of the pilot; or information carried in the pilot DRS includes configuration information of a pilot sequence in at least one other frequency band in a service frequency band, and the terminal obtains a candidate sequence in the at least one other frequency band according to the configuration information of the pilot sequence.

3) The terminal performs blind detection to detect a first frequency band accessed by the terminal, for example, determines the first frequency band by detecting a PSS/SSS (Primary Synchronization Signal/Secondary Synchronization Signal) or a DRS. For a candidate sequence in another second frequency band except the first frequency band, the candidate sequence may be determined according to a sequence number of the second frequency band, and a generation manner may be predefined. Optionally, in a frequency band for transmitting a PSS/SSS, the sequence number may be a cell identifier, and the terminal may access a cell by using the frequency band, which maintains backward compatibility.

Figure 8:
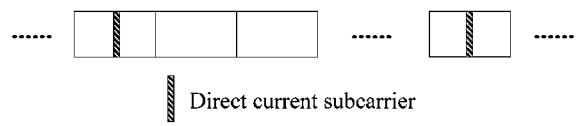
FIG. 8 is a schematic diagram of a direct current subcarrier in a candidate sequence according to a first embodiment of the present invention.

In this embodiment of the present invention, as shown in FIG. 8, a frequency band corresponding to the at least one first sequence includes a direct current subcarrier. When each first sequence is mapped to a corresponding frequency band, whether there is a direct current subcarrier in the corresponding frequency band, and a location of the direct current subcarrier are predefined or configured. A sequence element mapped to the direct current subcarrier is not transmitted, or no sequence element is mapped to the direct current subcarrier. Therefore, frequency bands that include direct current subcarriers may be flexibly configured, and the frequency bands including the direct current subcarriers may be used for access by the terminal.

In this embodiment of the present invention, the sequence number is an absolute number or a relative number. For example, the absolute number is an absolute frequency domain location number, or the relative number is a relative frequency domain location number. Each number of absolute frequency domain location numbers is in a one-to-one correspondence to a frequency band at an absolute location or an absolute frequency channel number, for example, an absolute frequency domain number may be equal to $$\left\lceil \frac{F}{\Delta f} \right\rceil \% N \text{ or } \left\lfloor \frac{F}{\Delta f} \right\rfloor \% N,$$

where $\lceil x \rceil$ indicates rounding up, $\lfloor x \rfloor$ indicates rounding down, and N is a positive integer.

Figure 9:
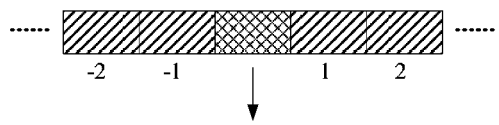
FIG. 9 is a schematic diagram of a relative sequence number according to a first embodiment of the present invention.

The relative frequency domain location number is a number obtained according to a location of the frequency band of the candidate sequence relative to a location of a first frequency band. As shown in FIG. 9, the first frequency band is a frequency band in which the terminal accesses a system, and frequency bands on two sides of the first frequency band are separately obtained by performing division by using C MHz as a unit, for example, numbers −1, −2, −3, . . . are separately obtained on the left side of the first frequency band according to a sequence, and numbers 1, 2, 3, . . . are separately obtained on the right side of the first frequency band according to a sequence.

Each sequence may be generated according to an independent initialization status value of a sequence generator. The initialization status value is determined according to the sequence number. The terminal generates, according to the following formula by using the sequence number, the initialization status value that is of the sequence generator and that corresponds to the candidate sequence:

$$c_{init}=2^{10}\cdot(7\cdot(n_s+1)+1+1)\cdot(2\cdot N_{ID}^{seq}+1)+2\cdot N_{ID}^{cell}+N_{CP},$$
or
$$c_{init}=2^{10}\cdot(7\cdot(n_s+1)+1+1)\cdot(2\cdot N_{ID}^{cell}+1)+2\cdot N_{ID}^{seq}+N_{CP},$$
or
$$c_{init}=2^{10}\cdot(7\cdot(n_s+1)+1+1)\cdot(2\cdot N_{ID}^{seq}+1)+2\cdot N_{ID}^{seq}+N_{CP},$$
where $c_{init}$ is the initialization status value that is of the sequence generator and that corresponds to the at least one candidate sequence, $n_s$ is a timeslot number, 1 is a number of an OFDM symbol in a timeslot, $N_{ID}^{seq}$ is the sequence number, $N_{ID}^{cell}$ is a cell number, and $N_{CP}$ is one in a case of a normal CP and $N_{CP}$ is zero in a case of an extended CP; and the terminal generates the candidate sequence according to the initialization status value.

In this embodiment of the present invention, parameters corresponding to the at least two first sequences are the same or different, and the parameters include at least one of sequence lengths, sequence numbers, or transmit power. A parameter of each first sequence is predefined or configured by the base station. A parameter of a first candidate sequence may be selected from at least two particular parameter values, or may be configured by using broadcast signaling, for example, by using an information element in a PBCH or an SIB (System information block) or another broadcast RRC signaling, or may be configured by using multicast signaling, for example, by using multicast DCI (Downlink Control Information)/DCI format 3/3A or another multicast RRC (Radio Resource Control) signaling, or may be configured by using UE-specific signaling, for example, by using a UE-specific PDCCH (Physical downlink control channel), an ePDCCH (enhanced PDCCH, enhanced physical downlink control channel), or RRC signaling. In each first sequence, transmit power is constant in a time domain, a frequency domain, or a time-frequency domain, thereby obtaining gains of frequency domain ICIC (Inter-Cell Interference Coordination), and reducing interference from the second sequence, that is, a pilot sequence, to a neighboring cell.

In this embodiment of the present invention, the terminal performs measurement according to a first sequence of the at least one first sequence, or the terminal performs measurement according to a sub-sequence of a first sequence of the at least one first sequence, for example, measures channel quality of a frequency band corresponding to the first sequence. Optionally, by means of predefinition or configuration by the base station, for measurement based on the first sequence, it is determined whether measurement may be performed based on more than one sequence segment. In this way, measurement may be flexibly performed by using different sequences, and moreover, an objective that different frequency bands corresponding to different sequences correspond to different measurement can be achieved.

In this embodiment of the present invention, in S11, in the step of connecting the at least one first sequence to generate a second sequence, the terminal connects at least two first sequences to generate the second sequence. Alternatively, the terminal may determine at least one third sequence, where the third sequence is a predefined sequence or a sequence that is determined according to a preconfigured identifier; and connect the at least one first sequence and the at least one third sequence, to obtain the second sequence. The third sequence may be a sequence used for access. The preconfigured identifier may be a preconfigured sequence segment number or cell identifier.

Figure 10:
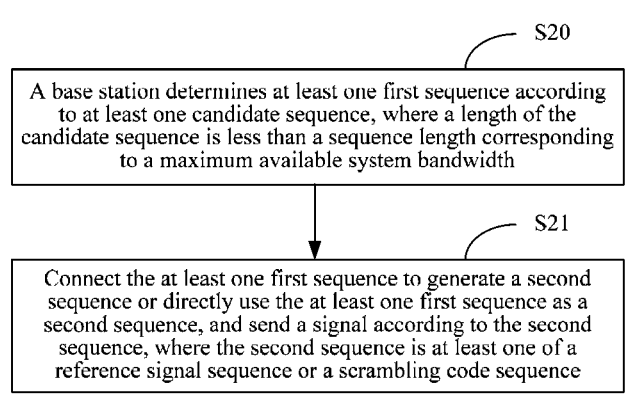
FIG. 10 is a schematic flowchart of a sequence generation method according to a third embodiment of the present invention.

Referring to FIG. 10, FIG. 10 is a schematic flowchart of a sequence generation method according to a third embodiment of the present invention. As shown in FIG. 10, the sequence generation method includes:

S20: A base station determines at least one first sequence according to at least one candidate sequence, where a length of the candidate sequence is less than a sequence length corresponding to a maximum available system bandwidth.

The candidate sequence may be generated according to a predefined length or a length that is selected by the base station or configured by a network control node. In a case in which the base station performs selection, the base station controls the length of the candidate sequence, which is used on, for example, a cellular network. In a case in which the network control node performs configuration, the network node controls the length of the candidate sequence, which is used on, for example, a wireless core network. If the length of the candidate sequence is preset by the base station, the base station further sends the preset length to a terminal. A length approximate to a length corresponding to an access bandwidth of the terminal and/or a bandwidth in which a network provides a service for the terminal may be selected as the length of the candidate sequence, or a length approximate to a length corresponding to a sub-bandwidth of an access bandwidth of the terminal and/or a bandwidth in which a network provides a service for the terminal may be selected as the length of the candidate sequence, that is, the length of the candidate sequence is less than a sequence length corresponding to a bandwidth used by the terminal. The length of the candidate sequence may also be less than a sequence length corresponding to a bandwidth used by the base station. Optionally, the length of the candidate sequence is less than or equal to a first length threshold. For example, the first length threshold may be a pilot sequence length corresponding to a system bandwidth of 20 MHz, 100 MHz or 1000 MHz. Lengths of different candidate sequences may be different, and in this way, a sequence whose length is more approximate to or shorter than that corresponding to an access bandwidth of the terminal and/or a bandwidth in which a network provides a service for the terminal may be selected to form a pilot sequence that can be seen by the base station. In S20, each first sequence of the at least one first sequence is a candidate sequence of the at least one candidate sequence or a sub-sequence of a candidate sequence of the at least one candidate sequence, and the sub-sequence is a part of the candidate sequence. When the candidate sequence includes at least two candidate sequences, the two candidate sequences are different, or when the first sequence includes at least two first sequences, the at least two first sequences are different; and candidate sequences or sub-sequences separately corresponding to the at least two first sequences are the same or different.

Figure 11:
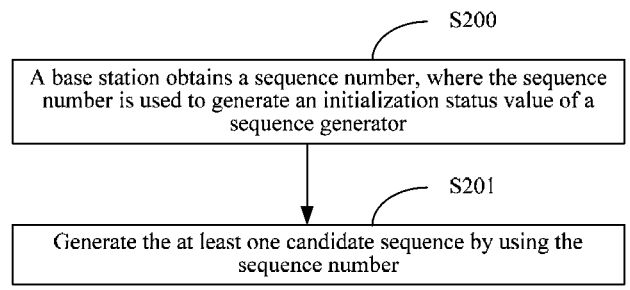
FIG. 11 is a schematic flowchart of a sequence generation method according to a fourth embodiment of the present invention.

As shown in FIG. 11, S20 includes:

S200: The base station obtains a sequence number, where the sequence number is used to generate an initialization status value of a sequence generator.

The sequence number is obtained according to presetting or selection that is performed by the base station or according to an identifier corresponding to the base station. The base station may further send the preset sequence number to the terminal.

In S200, the base station determines an access pilot of a frequency band that is used for access; and determines the sequence number of the at least one other frequency band according to a sequence relationship or a frequency band location relationship between the frequency band that is used for access and the at least one other frequency band. The sequence relationship between the frequency band that is used for access and the at least one other frequency band may be predefined, for example, a sequence segment number of the frequency band that is used for access and a sequence segment number of a sequence of the at least one other frequency band are in a progressive increase relationship according to frequency band locations, for example, a progressive increase step is 1, 2, 3, or the like. In this embodiment of the present invention, the base station may transmit, to the terminal, the access pilot that carries sequence configuration information of the at least one other frequency band, so that the terminal obtains the sequence configuration information of the at least one other frequency band according to information carried in the access pilot. Alternatively, the base station may indicate, to the terminal by using control signaling, configuration information of a pilot sequence in the at least one other frequency band except the frequency band that is used for access. Therefore, the base station may separately configure composition of a to-be-used sequence for terminals using different frequency bands, and separately send, in corresponding frequency bands, corresponding sequences; and in this case, sequences of different frequency bands may be unrelated, so that a sequence is used more flexibly. The terminal may be a legacy terminal, and in this case, a conventional sequence may be used in a frequency band corresponding to the legacy terminal, and the base station may provide a service for another terminal in another frequency band by using a sequence generated according to the present invention.

In this embodiment of the present invention, the sequence number is an absolute number or a relative number. For example, the absolute number is an absolute frequency domain location number, or the relative number is a relative frequency domain location number. Each number of absolute frequency domain location numbers is in a one-to-one correspondence to a frequency band at an absolute location or an absolute frequency channel number, for example, an absolute frequency domain number may be equal to $$\left\lceil \frac{F}{\Delta f} \right\rceil \% N \text{ or } \left\lfloor \frac{F}{\Delta f} \right\rfloor \% N,$$

where $\lceil x \rceil$ indicates rounding up, $\lfloor x \rfloor$ indicates rounding down, and N is a positive integer.

The relative frequency domain location number is a number obtained according to a location of the frequency band of the candidate sequence relative to a location of a first frequency band. The first frequency band is a frequency band in which the terminal accesses a system, and frequency bands on two sides of the first frequency band are separately obtained by performing division by using C MHz as a unit, for example, numbers –1, –2, –3, . . . are separately obtained on the left side of the first frequency band according to a sequence, and numbers 1, 2, 3, . . . are separately obtained on the right side of the first frequency band according to a sequence.

S201: Generate the at least one candidate sequence by using the sequence number.

In S201, the base station generates a corresponding quantity of candidate sequences according to the at least one sequence number; or the base station generates one candidate sequence according to one sequence number, and generates another candidate sequence according to a relative location of the at least one candidate sequence that is generated according to the sequence number. In the present invention, a manner of generating a candidate sequence may be controlled by the base station, for example, selection of the foregoing two manners of generating a candidate sequence may be controlled by the base station.

In this embodiment of the present invention, each candidate sequence is generated independently. For each candidate sequence, mapping may be performed in a manner of extending from the center of a transmission bandwidth to two sides of the transmission bandwidth; or for each candidate sequence, mapping may be performed in a manner of extending from one edge of a transmission bandwidth to the other edge of the transmission bandwidth, which includes extending from the left edge to the right edge, or extending from the right edge to the left edge. When there is more than one candidate sequence, although lengths of two candidate sequences are the same, the sequences may also be different.

In this embodiment of the present invention, a frequency band corresponding to the at least one first sequence includes a direct current subcarrier. When each first sequence is mapped to a corresponding frequency band, whether there is a direct current subcarrier in the corresponding frequency band, and a location of the direct current subcarrier are predefined or configured by the base station for the terminal. A sequence element mapped to the direct current subcarrier is not transmitted, or no sequence element is mapped to the direct current subcarrier. Therefore, frequency bands that include direct current subcarriers may be flexibly configured, and the frequency bands including the direct current subcarriers may be used for access by the terminal.

Each sequence may be generated according to an independent initialization status value of a sequence generator. The initialization status value is determined according to the sequence number. The base station generates, according to the following formula by using the sequence number, an initialization status value that is of a sequence generator and that corresponds to the candidate sequence:

$$c_{init}=2^{10} \cdot (7 \cdot (n_s+1)+1+1) \cdot (2 \cdot N_{ID}^{seq}+1)+2 \cdot N_{ID}^{cell}+N_{CP},$$

or $$c_{init}=2^{10} \cdot (7 \cdot (n_s+1)+1+1) \cdot (2 \cdot N_{ID}^{cell}+1)+2 \cdot N_{ID}^{seq}+N_{CP},$$

or $$c_{init}=2^{10} \cdot (7 \cdot (n_s+1)+1+1) \cdot (2 \cdot N_{ID}^{seq}+1)+2 \cdot N_{ID}^{seq}+N_{CP},$$

where $c_{init}$ is the initialization status value that is of the sequence generator and that corresponds to the at least one candidate sequence, $n_s$ is a timeslot number, 1 is a number of an OFDM symbol in a timeslot, $N_{ID}^{seq}$ is the sequence number, $N_{ID}^{cell}$ is a cell number, and $N_{CP}$ is one in a case of a normal CP and $N_{CP}$ is zero in a case of an extended CP; and the base station generates the candidate sequence according to the initialization status value.

In this embodiment of the present invention, parameters corresponding to the at least two first sequences are the same or different, and the parameters include at least one of sequence lengths, sequence numbers, or transmit power. A parameter of each first sequence is predefined or configured by the base station. A parameter of a first candidate sequence may be selected from at least two particular parameter values, or may be configured by using broadcast signaling, or may be configured by using multicast signaling, or may be configured by using UE-specific signaling. In each first sequence, transmit power is constant in a time domain, a frequency domain, or a time-frequency domain, thereby obtaining gains of frequency domain ICIC, and reducing interference from the second sequence, that is, a pilot sequence, to a neighboring cell.

The base station may further receive a measurement result of the terminal, where the measurement result is a result obtained by the terminal by performing measurement according to a first sequence of the at least one first sequence, or a result obtained by the terminal by performing measurement according to a sub-sequence of a first sequence of the at least one first sequence, for example, a result obtained by measuring channel quality of a frequency band corresponding to the first sequence. Optionally, by means of predefinition or configuration by the base station, for measurement based on the first sequence, the terminal determines whether measurement may be performed based on more than one sequence segment. In this way, measurement may be flexibly performed by using different sequences, and moreover, an objective that different frequency bands corresponding to different sequences correspond to different measurement can be achieved.

S21: Connect the at least one first sequence to generate a second sequence or directly use the at least one first sequence as a second sequence, and send a signal according to the second sequence, where the second sequence is at least one of a reference signal sequence or a scrambling code sequence. The second sequence includes but is not limited to at least one of the following: a CRS, a CSI-RS, a DL DM RS, a DRS, a PRS, an SRS, or an MB SFN RS.

Specifically, in S21, the base station may connect the at least one first sequence to generate the second sequence or directly use the at least one first sequence as the second sequence in the following three cases: a) The base station connects the at least one first sequence to obtain the second sequence, where in this case, a length of the second sequence is greater than a length of the first sequence; b) the base station selects a first sequence from the at least one first sequence, and directly uses the selected first sequence as the second sequence; and c) when a bandwidth used by the terminal is less than or equal to a frequency band corresponding to the candidate sequence, the base station selects a sequence from a candidate sequence and uses the sequence as the second sequence; or when a bandwidth used by the terminal is greater than a frequency band corresponding to the candidate sequence, the base station connects the at least one first sequence to generate the second sequence, where in this case, a length of the second sequence is greater than a length of the first sequence. When the base station connects the at least one first sequence to obtain the second sequence, the base station connects the at least one first sequence according to a location order, to form the second sequence, and then maps the second sequence to a time-frequency resource. In S21, the step of connecting the at least one first sequence to generate a second sequence includes: connecting, by the base station, at least two first sequences to generate the second sequence. Alternatively, the base station determines at least one third sequence, where the third sequence is a predefined sequence or a sequence that is determined according to a preconfigured identifier; and connects the at least one first sequence and the at least one third sequence, to obtain the second sequence. The third sequence may be a sequence used for access. The preconfigured identifier may be a preconfigured sequence segment number or cell identifier.

According to this embodiment of the present invention, on the basis that only several sequences or even a short sequence is generated, both the base station and the terminal can generate, by means of connection, a sequence to be actually used or directly use the sequences or the short sequence as a sequence to be actually used, instead of generating a sequence according to a total used bandwidth or a maximum system bandwidth that is of a serving base station or a serving cell and that includes a bandwidth that serves the terminal. Therefore, sequence generation is more efficient and is less complex, and causes less energy consumption. Moreover, massive computation required when a sequence is generated according to the maximum system bandwidth can be avoided, which can reduce computing resources.

When an eNB uses a non-standard bandwidth, or uses a high bandwidth such as 100 MHz, and a serving frequency band accessed by the terminal is only any part of a frequency band used by the eNB, the terminal may know only an access bandwidth of the terminal and/or a service bandwidth in which a network provides a service for the terminal, and may not know a bandwidth used by the eNB, and in this case, according to the sequence generation manner in the prior art, sequence generation for the terminal is less efficient and is more complex, which wastes computing resources and causes more energy consumption. Therefore, when a service bandwidth of the terminal is far less than a total used bandwidth or a maximum system bandwidth of a serving base station or a serving cell, and the terminal does not know the total used bandwidth or the maximum system bandwidth of the serving base station or the serving cell, beneficial effects of the present invention are especially obvious: Sequence generation is more efficient and is less complex, and causes less energy consumption. Moreover, massive computation required when a sequence is generated according to the maximum system bandwidth can be avoided, which can reduce computing resources.

Moreover, according to this embodiment of the present invention, sequences are mapped to different frequency bands more flexibly, which can therefore flexibly adapt to various different manners of using a frequency band by the terminal and the base station.

Figure 12:
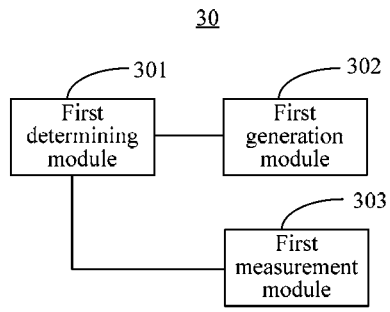
FIG. 12 is a schematic structural diagram of a terminal for sequence generation according to a first embodiment of the present invention.

Referring to FIG. 12, FIG. 12 is a schematic structural diagram of a terminal for sequence generation according to a first embodiment of the present invention. As shown in FIG. 12, the terminal 30 includes a first determining module 301 and a first generation module 302. The first determining module 301 is configured to determine at least one first sequence according to at least one candidate sequence, where a length of the candidate sequence is less than a sequence length corresponding to a maximum available system bandwidth. The first generation module 302 is connected to the first determining module 301, and is configured to connect the at least one first sequence to generate a second sequence or directly use the at least one first sequence as a second sequence, and receive a signal according to the second sequence, where the second sequence is at least one of a reference signal sequence or a scrambling code sequence. The second sequence includes but is not limited to at least one of the following: a CRS, a CSI-RS, a DL DM RS, a DRS, a PRS, an SRS, or an MBSFN RS. The second sequence is mapped to a frequency band in which the terminal receives a signal of the base station.

In this embodiment of the present invention, each first sequence of the at least one first sequence is a candidate sequence of the at least one candidate sequence or a sub-sequence of a candidate sequence of the at least one candidate sequence, and the sub-sequence is a part of the candidate sequence. When the candidate sequence includes at least two candidate sequences, the two candidate sequences are different, or when the first sequence includes at least two first sequences, the at least two first sequences are different; and candidate sequences or sub-sequences separately corresponding to the at least two first sequences are the same or different.

The candidate sequence may be generated according to a predefined length or a length that is configured by a base station or selected by the terminal. In a case in which the base station performs configuration, the base station controls the length of the candidate sequence, which is used on, for example, a cellular network. In a case in which the terminal selects a length, the terminal controls the length of the candidate sequence, which is used in, for example, a direct connection between terminals. A length approximate to a length corresponding to an access bandwidth of the terminal and/or a bandwidth in which a network provides a service for the terminal may be selected as the length of the candidate sequence, or a length approximate to a length corresponding to a sub-bandwidth of an access bandwidth of the terminal and/or a bandwidth in which a network provides a service for the terminal may be selected as the length of the candidate sequence, that is, the length of the candidate sequence is less than a sequence length corresponding to a bandwidth used by the terminal. Optionally, the length of the candidate sequence is less than or equal to a first length threshold. The first length threshold herein may be a sequence length corresponding to a total used bandwidth that is of a serving base station or a serving cell and that includes a bandwidth that serves the terminal. The first length threshold may be a pilot sequence length corresponding to a system bandwidth of 20 MHz, 100 MHz or 1000 MHz. Lengths of different candidate sequences may be different, and in this way, a sequence whose length is more approximate to or shorter than that corresponding to an access bandwidth of the terminal and/or a bandwidth in which a network provides a service for the terminal may be selected to form a pilot sequence that can be seen by the terminal.

In this embodiment of the present invention, a frequency band corresponding to the at least one first sequence includes a direct current subcarrier. When each first sequence is mapped to a corresponding frequency band, whether there is a direct current subcarrier in the corresponding frequency band, and a location of the direct current subcarrier are predefined or configured. A sequence element mapped to the direct current subcarrier is not transmitted, or no sequence element is mapped to the direct current subcarrier. Therefore, frequency bands that include direct current subcarriers may be flexibly configured, and the frequency bands including the direct current subcarriers may be used for access by the terminal.

In this embodiment of the present invention, the first determining module 301 is further configured to obtain a sequence number, where the sequence number is used to generate an initialization status value of a sequence generator; and generate the at least one candidate sequence by using the sequence number. The first determining module 301 obtains the sequence number according to presetting or a configuration received from the base station or according to an identifier corresponding to the terminal.

When the first determining module 301 obtains the sequence number, the first determining module 301 detects an access pilot of a frequency band that is used for access; and obtains, according to a detection result of the access pilot, the sequence number of at least one other frequency band except the frequency band that is used for access; or receives control signaling according to the access pilot, where the control signaling includes configuration information of a pilot sequence in at least one other frequency band except the frequency band that is used for access, and obtains, according to the configuration information of the pilot sequence, the sequence number of the at least one other frequency band except the frequency band that is used for access, where the configuration information of the pilot sequence includes the sequence number of the at least one other frequency band except the frequency band that is used for access; or the terminal receives control signaling sent by the base station, where the control signaling includes information about at least one sequence number and/or information about a manner of forming the second sequence. The obtaining, by the first determining module 301 according to a detection result of the access pilot, the sequence number of at least one other frequency band except the frequency band that is used for access includes: determining, by the first determining module 301, the sequence number of the at least one other frequency band according to sequence configuration information that is of the at least one other frequency band and that is carried in the access pilot, and/or a sequence relationship or a frequency band location relationship between the frequency band that is used for access and the at least one other frequency band. The sequence relationship between the frequency band that is used for access and the at least one other frequency band may be predefined, for example, a sequence segment number of the frequency band that is used for access and a sequence segment number of a sequence of the at least one other frequency band are in a progressive increase relationship according to locations of sequence segments in the second sequence, for example, a progressive increase step is 1, 2, 3, or the like.

When the first determining module 301 generates the at least one candidate sequence by using the sequence number, the first determining module 301 generates a corresponding quantity of candidate sequences according to the at least one sequence number; or generates one candidate sequence according to one sequence number, and generates another candidate sequence according to a relative location of the at least one candidate sequence that is generated according to the sequence number. In the present invention, a manner of generating a candidate sequence may be controlled by the base station, for example, selection of the foregoing two manners of generating a candidate sequence may be controlled by the base station.

In this embodiment of the present invention, the sequence number is an absolute number or a relative number. The absolute number is an absolute frequency domain location number, or the relative number is a relative frequency domain location number. Each number of absolute frequency domain location numbers is in a one-to-one correspondence to a frequency band at an absolute location or an absolute frequency channel number, for example, an absolute frequency domain number may be equal to $$\left\lceil \frac{F}{\Delta f} \right\rceil \% N \text{ or } \left\lfloor \frac{F}{\Delta f} \right\rfloor \% N,$$

where $\lceil x \rceil$ indicates rounding up, $\lfloor x \rfloor$ indicates rounding down, and N is a positive integer.

The relative frequency domain location number is a number obtained according to a location of the frequency band of the candidate sequence relative to a location of a first frequency band. The first frequency band is a frequency band in which the terminal accesses a system, and frequency bands on two sides of the first frequency band are separately obtained by performing division by using C MHz as a unit, for example, numbers −1, −2, −3, . . . are separately obtained on the left side of the first frequency band according to a sequence, and numbers 1, 2, 3, . . . are separately obtained on the right side of the first frequency band according to a sequence.

Each sequence may be generated according to an independent initialization status value of a sequence generator. The initialization status value is determined according to the sequence number. The first determining module 301 generates, according to the following formula by using the sequence number, an initialization status value that is of a sequence generator and that corresponds to the candidate sequence:

$$c_{init}=2^{10} \cdot (7 \cdot (n_s+1)+1+1) \cdot (2 \cdot N_{ID}^{seq}+1)+2 \cdot N_{ID}^{cell}+N_{CP},$$
or $$c_{init}=2^{10} \cdot (7 \cdot (n_s+1)+1+1) \cdot (2 \cdot N_{ID}^{cell}+1)+2 \cdot N_{ID}^{seq}+N_{CP},$$
or $$c_{init}=2^{10} \cdot (7 \cdot (n_s+1)+1+1) \cdot (2 \cdot N_{ID}^{seq}+1)+2 \cdot N_{ID}^{seq}+N_{CP},$$
where $c_{init}$ is the initialization status value that is of the sequence generator and that corresponds to the at least one candidate sequence, $n_s$ is a timeslot number, 1 is a number of an OFDM symbol in a timeslot, $N_{ID}^{seq}$ is the sequence number, $N_{ID}^{cell}$ is a cell number, and $N_{CP}$ is one in a case of a normal CP and $N_{CP}$ is zero in a case of an extended CP; and the first determining module 301 generates the candidate sequence according to the initialization status value.

In this embodiment of the present invention, parameters corresponding to the at least two first sequences are the same or different, and the parameters include at least one of sequence lengths, sequence numbers, or transmit power. A parameter of each first sequence is predefined or configured by the base station for the terminal. A parameter of a first candidate sequence may be selected from at least two particular parameter values, or may be configured by using broadcast signaling, or may be configured by using multicast signaling, or may be configured by using UE-specific signaling. In each first sequence, transmit power is constant in a time domain, a frequency domain, or a time-frequency domain, thereby obtaining gains of frequency domain ICIC, and reducing interference from the second sequence, that is, a pilot sequence, to a neighboring cell.

In this embodiment of the present invention, the first connection and generation module is further configured to connect at least two first sequences to generate the second sequence. Alternatively, the first connection and generation module is further configured to determine at least one third sequence, where the third sequence is a predefined sequence or a sequence that is determined according to a preconfigured identifier; and connect the at least one first sequence and the at least one third sequence, to obtain the second sequence. The third sequence may be a sequence used for access. The preconfigured identifier may be a preconfigured sequence segment number or cell identifier.

The terminal 30 further includes a first measurement module 303, where the first measurement module 303 is configured to perform measurement according to a first sequence of the at least one first sequence, or perform measurement according to a sub-sequence of a first sequence of the at least one first sequence, for example, measure channel quality of a frequency band corresponding to the first sequence. Optionally, by means of predefinition or configuration by the base station, for measurement based on the first sequence, it is determined whether measurement may be performed based on more than one sequence segment. In this way, measurement may be flexibly performed by using different sequences, and moreover, an objective that different frequency bands corresponding to different sequences correspond to different measurement can be achieved.

According to this embodiment of the present invention, the first determining module 301 determines at least one first sequence according to at least one candidate sequence, where a length of the candidate sequence is less than a sequence length corresponding to a maximum available system bandwidth; and the first generation module 302 connects the at least one first sequence to generate a second sequence or directly uses the at least one first sequence as a second sequence, and receives a signal according to the second sequence, where the second sequence is at least one of a reference signal sequence or a scrambling code sequence. Therefore, on the basis that only several sequences or even a short sequence is generated, the terminal can generate, by means of connection, a sequence to be actually used or directly use the sequences or the short sequence as a sequence to be actually used, that is, a second sequence. Therefore, sequence generation is more efficient and is less complex, and causes less energy consumption. Moreover, massive computation required when a sequence is generated according to a maximum system bandwidth in the prior art can be avoided, which can reduce computing resources.

Figure 13:
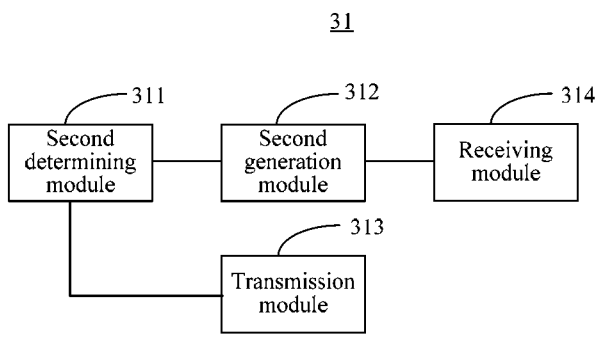
FIG. 13 is a schematic structural diagram of a base station for sequence generation according to a first embodiment of the present invention.

Referring to FIG. 13, FIG. 13 is a schematic structural diagram of a base station for sequence generation according to a first embodiment of the present invention. As shown in FIG. 13, the base station 31 includes a second determining module 311 and a second generation module 312. The second determining module 311 is configured to determine at least one first sequence according to at least one candidate sequence, where a length of the candidate sequence is less than a sequence length corresponding to a maximum available system bandwidth. The second generation module 312 is connected to the second determining module 311, and is configured to connect the at least one first sequence to generate a second sequence or directly use the at least one first sequence as a second sequence, and send a signal according to the second sequence, where the second sequence is at least one of a reference signal sequence or a scrambling code sequence. The second sequence includes but is not limited to at least one of the following: a CRS, a CSI-RS, a DL DM RS, a DRS, a PRS, an SRS, or an MBSFN RS.

In this embodiment of the present invention, each first sequence of the at least one first sequence is a candidate sequence of the at least one candidate sequence or a sub-sequence of a candidate sequence of the at least one candidate sequence, and the sub-sequence is a part of the candidate sequence. When the candidate sequence includes at least two candidate sequences, the two candidate sequences are different, or when the first sequence includes at least two first sequences, the at least two first sequences are different; and candidate sequences or sub-sequences separately corresponding to the at least two first sequences are the same or different.

The candidate sequence may be generated according to a predefined length or a length that is selected by the base station or configured by a network control node. In a case in which the base station performs selection, the base station controls the length of the candidate sequence, which is used on, for example, a cellular network. In a case in which the network control node performs configuration, the network node controls the length of the candidate sequence, which is used on, for example, a wireless core network. If the length of the candidate sequence is preset, the second generation module 312 further sends the preset length to a terminal. A length approximate to a length corresponding to an access bandwidth of the terminal and/or a bandwidth in which a network provides a service for the terminal may be selected as the length of the candidate sequence, or a length approximate to a length corresponding to a sub-bandwidth of an access bandwidth of the terminal and/or a bandwidth in which a network provides a service for the terminal may be selected as the length of the candidate sequence, that is, the length of the candidate sequence is less than a sequence length corresponding to a bandwidth used by the terminal. The length of the candidate sequence may also be less than a sequence length corresponding to a bandwidth used by the base station. Optionally, the length of the candidate sequence is less than or equal to a first length threshold. The first length threshold may be a pilot sequence length corresponding to a system bandwidth of 20 MHz, 100 MHz or 1000 MHz. Lengths of different candidate sequences may be different, and in this way, a sequence whose length is more approximate to or shorter than that corresponding to an access bandwidth of the terminal and/or a bandwidth in which a network provides a service for the terminal may be selected to form a pilot sequence that can be seen by the base station.

In this embodiment of the present invention, a frequency band corresponding to the at least one first sequence includes a direct current subcarrier. When each first sequence is mapped to a corresponding frequency band, whether there is a direct current subcarrier in the corresponding frequency band, and a location of the direct current subcarrier are predefined or configured by the base station for the terminal. A sequence element mapped to the direct current subcarrier is not transmitted, or no sequence element is mapped to the direct current subcarrier. Therefore, frequency bands that include direct current subcarriers may be flexibly configured, and the frequency bands including the direct current subcarriers may be used for access by the terminal.

In this embodiment of the present invention, the second determining module 311 is further configured to obtain a sequence number, where the sequence number is used to generate an initialization status value of a sequence generator; and generate the at least one candidate sequence by using the sequence number. The second determining module 311 obtains the sequence number according to presetting or selection that is performed by the base station or according to an identifier corresponding to the base station, and sends the preset sequence number to the terminal.

When the second determining module 311 obtains the sequence number, the second determining module 311 determines an access pilot of a frequency band that is used for access; and determines the sequence number of the at least one other frequency band according to a sequence relationship or a frequency band location relationship between the frequency band that is used for access and the at least one other frequency band. The sequence relationship between the frequency band that is used for access and the at least one other frequency band may be predefined, for example, a sequence segment number of the frequency band that is used for access and a sequence segment number of a sequence of the at least one other frequency band are in a progressive increase relationship according to frequency band locations, for example, a progressive increase step is 1, 2, 3, or the like. In this embodiment of the present invention, the base station 31 further includes a transmission module 313, connected to the second determining module 311, and configured to transmit, to the terminal, the access pilot that carries sequence configuration information of the at least one other frequency band, so that the terminal obtains the sequence configuration information of the at least one other frequency band according to information carried in the access pilot. Alternatively, the transmission module 313 is further configured to indicate, to the terminal by using control signaling, configuration information of a pilot sequence in the at least one other frequency band except the frequency band that is used for access. Therefore, the base station may separately configure composition of a to-be-used sequence for terminals using different frequency bands, and separately send, in corresponding frequency bands, corresponding sequences; and in this case, sequences of different frequency bands may be unrelated, so that a sequence is used more flexibly. The terminal may be a legacy terminal, and in this case, a conventional sequence may be used in a frequency band corresponding to the legacy terminal, and the base station may provide a service for another terminal in another frequency band by using a sequence generated according to the present invention.

When the second determining module 311 generates the at least one candidate sequence by using the sequence number, the second determining module 311 generates a corresponding quantity of candidate sequences according to the at least one sequence number. Alternatively, the second determining module 311 generates one candidate sequence according to one sequence number, and generates another candidate sequence according to a relative location of the at least one candidate sequence that is generated according to the sequence number. In the present invention, a manner of generating a candidate sequence may be controlled by the base station, for example, selection of the foregoing two manners of generating a candidate sequence may be controlled by the base station.

Each candidate sequence is generated independently. For each candidate sequence, mapping may be performed in a manner of extending from the center of a transmission bandwidth to two sides of the transmission bandwidth; or for each candidate sequence, mapping may be performed in a manner of extending from one edge of a transmission bandwidth to the other edge of the transmission bandwidth, which includes extending from the left edge to the right edge, or extending from the right edge to the left edge. When there is more than one candidate sequence, although lengths of two candidate sequences are the same, the sequences may also be different.

In this embodiment of the present invention, the sequence number is an absolute number or a relative number. For example, the absolute number is an absolute frequency domain location number, or the relative number is a relative frequency domain location number. Each number of absolute frequency domain location numbers is in a one-to-one correspondence to a frequency band at an absolute location or an absolute frequency channel number, for example, an absolute frequency domain number may be equal to $$\lceil \frac{F}{\Delta f} \rceil \% N \text{ or } \lfloor \frac{F}{\Delta f} \rfloor \% N,$$

where $\lceil x \rceil$ indicates rounding up, $\lfloor x \rfloor$ indicates rounding down, and N is a positive integer.

The relative frequency domain location number is a number obtained according to a location of the frequency band of the candidate sequence relative to a location of a first frequency band. The first frequency band is a frequency band in which the terminal accesses a system, and frequency bands on two sides of the first frequency band are separately obtained by performing division by using C MHz as a unit, for example, numbers −1, −2, −3, . . . are separately obtained on the left side of the first frequency band according to a sequence, and numbers 1, 2, 3, . . . are separately obtained on the right side of the first frequency band according to a sequence.

Each sequence may be generated according to an independent initialization status value of a sequence generator. The initialization status value is determined according to the sequence number. The second determining module 311 generates, according to the following formula by using the sequence number, an initialization status value that is of a sequence generator and that corresponds to the candidate sequence:

$$c_{init}=2^{10} \cdot (7 \cdot (n_s+1)+1+1) \cdot (2 \cdot N_{ID}^{seq}+1)+2 \cdot N_{ID}^{cell}+N_{CP},$$
or $$c_{init}=2^{10} \cdot (7 \cdot (n_s+1)+1+1) \cdot (2 \cdot N_{ID}^{cell}+1)+2 \cdot N_{ID}^{seq}+N_{CP},$$
or $$c_{init}=2^{10} \cdot (7 \cdot (n_s+1)+1+1) \cdot (2 \cdot N_{ID}^{seq}+1)+2 \cdot N_{ID}^{seq}+N_{CP},$$
where $c_{init}$ is the initialization status value that is of the sequence generator and that corresponds to the at least one candidate sequence, $n_s$ is a timeslot number, 1 is a number of an OFDM symbol in a timeslot, $N_{ID}^{seq}$ is the sequence number, $N_{ID}^{cell}$ is a cell number, and $N_{CP}$ is one in a case of a normal CP and $N_{CP}$ is zero in a case of an extended CP; and the second determining module 311 generates the candidate sequence according to the initialization status value.

In this embodiment of the present invention, parameters corresponding to the at least two first sequences are the same or different, and the parameters include at least one of sequence lengths, sequence numbers, or transmit power. A parameter of each first sequence is predefined or configured by the base station for the terminal. A parameter of a first candidate sequence may be selected from at least two particular parameter values, or may be configured by using broadcast signaling, or may be configured by using multicast signaling, or may be configured by using UE-specific signaling. In each first sequence, transmit power is constant in a time domain, a frequency domain, or a time-frequency domain, thereby obtaining gains of frequency domain ICIC, and reducing interference from the second sequence, that is, a pilot sequence, to a neighboring cell.

In this embodiment of the present invention, the second determining module 312 may connect at least two first sequences to generate the second sequence. Alternatively, the second determining module 311 may determine at least one third sequence, where the third sequence is a predefined sequence or a sequence that is determined according to a preconfigured identifier; and connect the at least one first sequence and the at least one third sequence, to obtain the second sequence. The third sequence may be a sequence used for access. The preconfigured identifier may be a preconfigured sequence segment number or cell identifier.

The base station 31 further includes a receiving module 314, configured to receive a measurement result of the terminal, where the measurement result is a result obtained by the terminal by performing measurement according to a first sequence of the at least one first sequence, or a result obtained by the terminal by performing measurement according to a sub-sequence of a first sequence of the at least one first sequence, for example, a result obtained by measuring channel quality of a frequency band corresponding to the first sequence. Optionally, by means of predefinition or configuration by the base station, for measurement based on the first sequence, the terminal determines whether measurement may be performed based on more than one sequence segment. In this way, measurement may be flexibly performed by using different sequences, and moreover, an objective that different frequency bands corresponding to different sequences correspond to different measurement can be achieved.

According to this embodiment of the present invention, on the basis that only several sequences or even a short sequence is generated, both the base station and the terminal can generate, by means of connection, a sequence to be actually used or directly use the sequences or the short sequence as a sequence to be actually used, instead of generating a sequence according to a total used bandwidth or a maximum system bandwidth that is of a serving base station or a serving cell and that includes a bandwidth that serves the terminal.

When an eNB uses a non-standard bandwidth, or uses a high bandwidth such as 100 MHz, and a serving frequency band accessed by the terminal is only any part of a frequency band used by the eNB, the terminal may know only an access bandwidth of the terminal and/or a service bandwidth in which a network provides a service for the terminal, and may not know a bandwidth used by the eNB, and in this case, according to the sequence generation manner in the prior art, sequence generation for the terminal is less efficient and is more complex, which wastes computing resources and causes more energy consumption. Therefore, when a service bandwidth of the terminal is far less than a total used bandwidth or a maximum system bandwidth of a serving base station or a serving cell, and the terminal does not know the total used bandwidth or the maximum system bandwidth of the serving base station or the serving cell, beneficial effects of the present invention are especially obvious: Sequence generation is more efficient and is less complex, and causes less energy consumption. Moreover, massive computation required when a sequence is generated according to the maximum system bandwidth can be avoided, which can reduce computing resources.

Moreover, according to this embodiment of the present invention, sequences are mapped to different frequency bands more flexibly, which can therefore flexibly adapt to various different manners of using a frequency band by the terminal and the base station.

Figure 14:
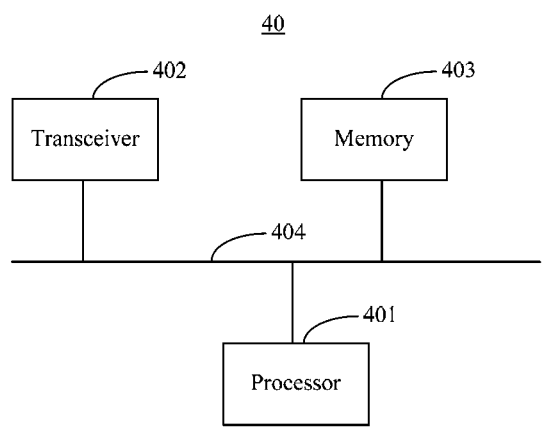
FIG. 14 is a schematic structural diagram of a terminal for sequence generation according to a second embodiment of the present invention.

Referring to FIG. 14, FIG. 14 is a schematic structural diagram of a terminal for sequence generation according to a second embodiment of the present invention. As shown in FIG. 14, the terminal 40 includes: a processor 401, a transceiver 402, a memory 403, and a data bus 404. The processor 401, the transceiver 402, and the memory 403 are interconnected by using the data bus 404, to communicate with each other.

In this embodiment of the present invention, the processor 401 determines at least one first sequence according to at least one candidate sequence, where a length of the candidate sequence is less than a sequence length corresponding to a maximum available system bandwidth; and connects the at least one first sequence to generate a second sequence or directly uses the at least one first sequence as a second sequence, and receives a signal according to the second sequence, where the second sequence is at least one of a reference signal sequence or a scrambling code sequence. The second sequence includes but is not limited to at least one of the following: a CRS, a CSI-RS, a DL DM RS, a DRS, a PRS, an SRS, or an MBSFN RS. The second sequence is mapped to a frequency band in which the terminal receives a signal of the base station.

In this embodiment of the present invention, each first sequence of the at least one first sequence is a candidate sequence of the at least one candidate sequence or a sub-sequence of a candidate sequence of the at least one candidate sequence, and the sub-sequence is a part of the candidate sequence. When the candidate sequence includes at least two candidate sequences, the two candidate sequences are different, or when the first sequence includes at least two first sequences, the at least two first sequences are different; and candidate sequences or sub-sequences separately corresponding to the at least two first sequences are the same or different.

The candidate sequence may be generated according to a predefined length or a length that is configured by a base station or selected by the terminal. In a case in which the base station performs configuration, the base station controls the length of the candidate sequence, which is used on, for example, a cellular network. In a case in which the terminal selects a length, the terminal controls the length of the candidate sequence, which is used in, for example, a direct connection between terminals. A length approximate to a length corresponding to an access bandwidth of the terminal and/or a bandwidth in which a network provides a service for the terminal may be selected as the length of the candidate sequence, or a length approximate to a length corresponding to a sub-bandwidth of an access bandwidth of the terminal and/or a bandwidth in which a network provides a service for the terminal may be selected as the length of the candidate sequence, that is, the length of the candidate sequence is less than a sequence length corresponding to a bandwidth used by the terminal. Optionally, the length of the candidate sequence is less than or equal to a first length threshold. The first length threshold herein may be a sequence length corresponding to a total used bandwidth that is of a serving base station or a serving cell and that includes a bandwidth that serves the terminal. The first length threshold may be a pilot sequence length corresponding to a system bandwidth of 20 MHz, 100 MHz or 1000 MHz. Lengths of different candidate sequences may be different, and in this way, a sequence whose length is more approximate to or shorter than that corresponding to an access bandwidth of the terminal and/or a bandwidth in which a network provides a service for the terminal may be selected to form a pilot sequence that can be seen by the terminal. The transceiver 402 receives a first length threshold that is of the candidate sequence and that is configured by the base station side and sent by the base station side. The memory 403 stores the first length threshold of the candidate sequence.

In this embodiment of the present invention, a frequency band corresponding to the at least one first sequence includes a direct current subcarrier. When each first sequence is mapped to a corresponding frequency band, whether there is a direct current subcarrier in the corresponding frequency band, and a location of the direct current subcarrier are predefined or configured. A sequence element mapped to the direct current subcarrier is not transmitted, or no sequence element is mapped to the direct current subcarrier. Therefore, frequency bands that include direct current subcarriers may be flexibly configured, and the frequency bands including the direct current subcarriers may be used for access by the terminal.

In this embodiment of the present invention, the processor 401 obtains a sequence number, where the sequence number is used to generate an initialization status value of a sequence generator; and generates the at least one candidate sequence by using the sequence number. The processor 401 obtains the sequence number according to presetting or a configuration received from the base station or according to an identifier corresponding to the terminal.

When the processor 401 obtains the sequence number, the processor 401 detects an access pilot of a frequency band that is used for access; and obtains, according to a detection result of the access pilot, the sequence number of at least one other frequency band except the frequency band that is used for access; or receives control signaling according to the access pilot, where the control signaling includes configuration information of a pilot sequence in at least one other frequency band except the frequency band that is used for access, and obtains, according to the configuration information of the pilot sequence, the sequence number of the at least one other frequency band except the frequency band that is used for access, where the configuration information of the pilot sequence includes the sequence number of the at least one other frequency band except the frequency band that is used for access; or receives control signaling sent by the base station, where the control signaling includes information about at least one sequence number and/or information about a manner of forming the second sequence. The obtaining, by the processor 401 according to a detection result of the access pilot, the sequence number of at least one other frequency band except the frequency band that is used for access includes: determining, by the processor 401, the sequence number of the at least one other frequency band according to sequence configuration information that is of the at least one other frequency band and that is carried in the access pilot, and/or a sequence relationship or a frequency band location relationship between the frequency band that is used for access and the at least one other frequency band. The sequence relationship between the frequency band that is used for access and the at least one other frequency band may be predefined, for example, a sequence segment number of the frequency band that is used for access and a sequence segment number of a sequence of the at least one other frequency band are in a progressive increase relationship according to locations of sequence segments in the second sequence, for example, a progressive increase step is 1, 2, 3, or the like.

When the processor 401 generates the at least one candidate sequence by using the sequence number, the processor 401 generates a corresponding quantity of candidate sequences according to the at least one sequence number; or generates one candidate sequence according to one sequence number, and generates another candidate sequence according to a relative location of the at least one candidate sequence that is generated according to the sequence number. In the present invention, a manner of generating a candidate sequence may be controlled by the base station, for example, selection of the foregoing two manners of generating a candidate sequence may be controlled by the base station.

In this embodiment of the present invention, the sequence number is an absolute number or a relative number. The absolute number is an absolute frequency domain location number, or the relative number is a relative frequency domain location number. Each number of absolute frequency domain location numbers is in a one-to-one correspondence to a frequency band at an absolute location or an absolute frequency channel number, for example, an absolute frequency domain number may be equal to $$\left\lceil \frac{F}{\Delta f} \right\rceil \% N \text{ or } \left\lfloor \frac{F}{\Delta f} \right\rfloor \% N,$$

where $\lceil x \rceil$ indicates rounding up, $\lfloor x \rfloor$ indicates rounding down, and N is a positive integer.

The relative frequency domain location number is a number obtained according to a location of the frequency band of the candidate sequence relative to a location of a first frequency band. The first frequency band is a frequency band in which the terminal accesses a system, and frequency bands on two sides of the first frequency band are separately obtained by performing division by using C MHz as a unit, for example, numbers −1, −2, −3, . . . are separately obtained on the left side of the first frequency band according to a sequence, and numbers 1, 2, 3, . . . are separately obtained on the right side of the first frequency band according to a sequence.

Each sequence may be generated according to an independent initialization status value of a sequence generator. The initialization status value is determined according to the sequence number. The processor 401 generates, according to the following formula by using the sequence number, an initialization status value that is of a sequence generator and that corresponds to the candidate sequence:

$$c_{init}=2^{10}\cdot(7\cdot(n_s+1)+1+1)\cdot(2\cdot N_{ID}^{seq}+1)+2\cdot N_{ID}^{cell}+N_{CP},$$
or $$c_{init}=2^{10}\cdot(7\cdot(n_s+1)+1+1)\cdot(2\cdot N_{ID}^{cell}+1)+2\cdot N_{ID}^{seq}+N_{CP},$$
or $$c_{init}=2^{10}\cdot(7\cdot(n_s+1)+1+1)\cdot(2\cdot N_{ID}^{seq}+1)+2\cdot N_{ID}^{seq}+N_{CP},$$
where $c_{init}$ is the initialization status value that is of the sequence generator and that corresponds to the at least one candidate sequence, $n_s$ is a timeslot number, 1 is a number of an OFDM symbol in a timeslot, $N_{ID}^{seq}$ is the sequence number, $N_{ID}^{cell}$ is a cell number, and $N_{CP}$ is one in a case of a normal CP and $N_{CP}$ is zero in a case of an extended CP; and the processor 401 generates the candidate sequence according to the initialization status value.

In this embodiment of the present invention, parameters corresponding to the at least two first sequences are the same or different, and the parameters include at least one of sequence lengths, sequence numbers, or transmit power. A parameter of each first sequence is predefined or configured by the base station for the terminal. A parameter of a first candidate sequence may be selected from at least two particular parameter values, or may be configured by using broadcast signaling, or may be configured by using multicast signaling, or may be configured by using UE-specific signaling. In each first sequence, transmit power is constant in a time domain, a frequency domain, or a time-frequency domain, thereby obtaining gains of frequency domain ICIC, and reducing interference from the second sequence, that is, a pilot sequence, to a neighboring cell.

In this embodiment of the present invention, the processor 401 may connect at least two first sequences to generate the second sequence. Alternatively, the processor 401 may further determine at least one third sequence, where the third sequence is a predefined sequence or a sequence that is determined according to a preconfigured identifier; and connect the at least one first sequence and the at least one third sequence, to obtain the second sequence. The third sequence may be a sequence used for access. The preconfigured identifier may be a preconfigured sequence segment number or cell identifier.

The processor 401 further performs measurement according to a first sequence of the at least one first sequence, or performs measurement according to a sub-sequence of a first sequence of the at least one first sequence, for example, measures channel quality of a frequency band corresponding to the first sequence. Optionally, by means of predefinition or configuration by the base station, for measurement based on the first sequence, it is determined whether measurement may be performed based on more than one sequence segment. In this way, measurement may be flexibly performed by using different sequences, and moreover, an objective that different frequency bands corresponding to different sequences correspond to different measurement can be achieved.

According to this embodiment of the present invention, the processor 401 determines at least one first sequence according to at least one candidate sequence, where a length of the candidate sequence is less than a sequence length corresponding to a maximum available system bandwidth; and connects the at least one first sequence to generate a second sequence or directly uses the at least one first sequence as a second sequence, and receives a signal according to the second sequence, where the second sequence is at least one of a reference signal sequence or a scrambling code sequence. Therefore, on the basis that only several sequences or even a short sequence is generated, the terminal can generate, by means of connection, a sequence to be actually used or directly use the sequences or the short sequence as a sequence to be actually used, that is, a second sequence. Therefore, sequence generation is more efficient and is less complex, and causes less energy consumption. Moreover, massive computation required when a sequence is generated according to a maximum system bandwidth in the prior art can be avoided, which can reduce computing resources.

Figure 15:
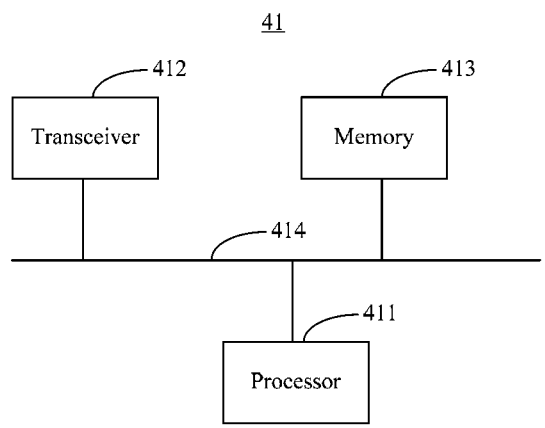
FIG. 15 is a schematic structural diagram of a base station for sequence generation according to a second embodiment of the present invention.

Referring to FIG. 15, FIG. 15 is a schematic structural diagram of a base station for sequence generation according to a second embodiment of the present invention. As shown in FIG. 15, the base station 41 includes: a processor 411, a transceiver 412, a memory 413, and a data bus 414. The processor 411, the transceiver 412, and the memory 413 are interconnected by using the data bus 414, to communicate with each other.

In this embodiment of the present invention, the processor 411 determines at least one first sequence according to at least one candidate sequence, where a length of the candidate sequence is less than a sequence length corresponding to a maximum available system bandwidth; and connects the at least one first sequence to generate a second sequence or directly uses the at least one first sequence as a second sequence, and sends a signal according to the second sequence, where the second sequence is at least one of a reference signal sequence or a scrambling code sequence. The second sequence includes but is not limited to at least one of the following: a CRS, a CSI-RS, a DL DM RS, a DRS, a PRS, an SRS, or an MBSFN RS.

In this embodiment of the present invention, each first sequence of the at least one first sequence is a candidate sequence of the at least one candidate sequence or a sub-sequence of a candidate sequence of the at least one candidate sequence, and the sub-sequence is a part of the candidate sequence. When the candidate sequence includes at least two candidate sequences, the two candidate sequences are different, or when the first sequence includes at least two first sequences, the at least two first sequences are different; and candidate sequences or sub-sequences separately corresponding to the at least two first sequences are the same or different.

The candidate sequence may be generated according to a predefined length or a length that is selected by the base station or configured by a network control node. In a case in which the base station performs selection, the base station controls the length of the candidate sequence, which is used on, for example, a cellular network. In a case in which the network control node performs configuration, the network node controls the length of the candidate sequence, which is used on, for example, a wireless core network. If the length of the candidate sequence is preset, the transceiver 412 further sends the preset length to a terminal. A length approximate to a length corresponding to an access bandwidth of the terminal and/or a bandwidth in which a network provides a service for the terminal may be selected as the length of the candidate sequence, or a length approximate to a length corresponding to a sub-bandwidth of an access bandwidth of the terminal and/or a bandwidth in which a network provides a service for the terminal may be selected as the length of the candidate sequence, that is, the length of the candidate sequence is less than a sequence length corresponding to a bandwidth used by the terminal. The length of the candidate sequence may also be less than a sequence length corresponding to a bandwidth used by the base station. Optionally, the length of the candidate sequence is less than or equal to a first length threshold. The first length threshold may be a pilot sequence length corresponding to a system bandwidth of 20 MHz, 100 MHz or 1000 MHz. The memory 413 stores the first length threshold. Lengths of different candidate sequences may be different, and in this way, a sequence whose length is more approximate to or shorter than that corresponding to an access bandwidth of the terminal and/or a bandwidth in which a network provides a service for the terminal may be selected to form a pilot sequence that can be seen by the base station.

In this embodiment of the present invention, a frequency band corresponding to the at least one first sequence includes a direct current subcarrier. When each first sequence is mapped to a corresponding frequency band, whether there is a direct current subcarrier in the corresponding frequency band, and a location of the direct current subcarrier are predefined or configured by the base station for the terminal. A sequence element mapped to the direct current subcarrier is not transmitted, or no sequence element is mapped to the direct current subcarrier. Therefore, frequency bands that include direct current subcarriers may be flexibly configured, and the frequency bands including the direct current subcarriers may be used for access by the terminal.

In this embodiment of the present invention, the processor 411 obtains a sequence number, where the sequence number is used to generate an initialization status value of a sequence generator; and generates the at least one candidate sequence by using the sequence number. The transceiver 412 may be configured to send the preset sequence number to the terminal. The processor 411 obtains the sequence number according to presetting or selection that is performed by the base station or according to an identifier corresponding to the base station, and sends the preset sequence number to the terminal.

When the processor 411 obtains the sequence number, the processor 411 determines an access pilot of a frequency band that is used for access; and determines the sequence number of the at least one other frequency band according to a sequence relationship or a frequency band location relationship between the frequency band that is used for access and the at least one other frequency band. The sequence relationship between the frequency band that is used for access and the at least one other frequency band may be predefined, for example, a sequence segment number of the frequency band that is used for access and a sequence segment number of a sequence of the at least one other frequency band are in a progressive increase relationship according to frequency band locations, for example, a progressive increase step is 1, 2, 3, or the like. In this embodiment of the present invention, the transceiver 412 further transmits, to the terminal, the access pilot that carries sequence configuration information of the at least one other frequency band, so that the terminal obtains the sequence configuration information of the at least one other frequency band according to information carried in the access pilot. Alternatively, the transceiver 412 further indicates, to the terminal by using control signaling, configuration information of a pilot sequence in the at least one other frequency band except the frequency band that is used for access. Therefore, the base station may separately configure composition of a to-be-used sequence for terminals using different frequency bands, and separately send, in corresponding frequency bands, corresponding sequences; and in this case, sequences of different frequency bands may be unrelated, so that a sequence is used more flexibly. The terminal may be a legacy terminal, and in this case, a conventional sequence may be used in a frequency band corresponding to the legacy terminal, and the base station may provide a service for another terminal in another frequency band by using a sequence generated according to the present invention.

When the processor 411 generates the at least one candidate sequence by using the sequence number, the processor 411 generates a corresponding quantity of candidate sequences according to the at least one sequence number. Alternatively, the processor 411 generates one candidate sequence according to one sequence number, and generates another candidate sequence according to a relative location of the at least one candidate sequence that is generated according to the sequence number. In the present invention, a manner of generating a candidate sequence may be controlled by the base station, for example, selection of the foregoing two manners of generating a candidate sequence may be controlled by the base station.

Each candidate sequence is generated independently. For each candidate sequence, mapping may be performed in a manner of extending from the center of a transmission bandwidth to two sides of the transmission bandwidth; or for each candidate sequence, mapping may be performed in a manner of extending from one edge of a transmission bandwidth to the other edge of the transmission bandwidth, which includes extending from the left edge to the right edge, or extending from the right edge to the left edge. When there is more than one candidate sequence, although lengths of two candidate sequences are the same, the sequences may also be different.

In this embodiment of the present invention, the sequence number is an absolute number or a relative number. For example, the absolute number is an absolute frequency domain location number, or the relative number is a relative frequency domain location number. Each number of absolute frequency domain location numbers is in a one-to-one correspondence to a frequency band at an absolute location or an absolute frequency channel number, for example, an absolute frequency domain number may be equal to $$\left\lceil \frac{F}{\Delta f} \right\rceil \% N \text{ or } \left\lfloor \frac{F}{\Delta f} \right\rfloor \% N,$$

where $\lceil x \rceil$ indicates rounding up, $\lfloor x \rfloor$ indicates rounding down, and N is a positive integer.

The relative frequency domain location number is a number obtained according to a location of the frequency band of the candidate sequence relative to a location of a first frequency band. The first frequency band is a frequency band in which the terminal accesses a system, and frequency bands on two sides of the first frequency band are separately obtained by performing division by using C MHz as a unit, for example, numbers −1, −2, −3, . . . are separately obtained on the left side of the first frequency band according to a sequence, and numbers 1, 2, 3, . . . are separately obtained on the right side of the first frequency band according to a sequence.

Each sequence may be generated according to an independent initialization status value of a sequence generator. The initialization status value is determined according to the sequence number. The processor 411 generates, according to the following formula by using the sequence number, an initialization status value that is of a sequence generator and that corresponds to the candidate sequence:

$$c_{init}=2^{10} \cdot (7 \cdot (n_s+1)+1+1) \cdot (2 \cdot N_{ID}^{seq}+1)+2 \cdot N_{ID}^{cell}+N_{CP},$$

or $$c_{init}=2^{10} \cdot (7 \cdot (n_s+1)+1+1) \cdot (2 \cdot N_{ID}^{cell}+1)+2 \cdot N_{ID}^{seq}+N_{CP},$$

or $$c_{init}=2^{10} \cdot (7 \cdot (n_s+1)+1+1) \cdot (2 \cdot N_{ID}^{seq}+1)+2 \cdot N_{ID}^{seq}+N_{CP},$$

where $c_{init}$ is the initialization status value that is of the sequence generator and that corresponds to the at least one candidate sequence, $n_s$ is a timeslot number, 1 is a number of an OFDM symbol in a timeslot, $N_{ID}^{seq}$ is the sequence number, $N_{ID}^{cell}$ is a cell number, and $N_{CP}$ is one in a case of a normal CP and $N_{CP}$ is zero in a case of an extended CP; and the processor 411 generates the candidate sequence according to the initialization status value.

In this embodiment of the present invention, parameters corresponding to the at least two first sequences are the same or different, and the parameters include at least one of sequence lengths, sequence numbers, or transmit power. A parameter of each first sequence is predefined or configured by the base station for the terminal. A parameter of a first candidate sequence may be selected from at least two particular parameter values, or may be configured by using broadcast signaling, or may be configured by using multicast signaling, or may be configured by using UE-specific signaling. In each first sequence, transmit power is constant in a time domain, a frequency domain, or a time-frequency domain, thereby obtaining gains of frequency domain ICIC, and reducing interference from the second sequence, that is, a pilot sequence, to a neighboring cell.

In this embodiment of the present invention, the transceiver 412 further receives a measurement result of the terminal, where the measurement result is a result obtained by the terminal by performing measurement according to a first sequence of the at least one first sequence, or a result obtained by the terminal by performing measurement according to a sub-sequence of a first sequence of the at least one first sequence, for example, a result obtained by measuring channel quality corresponding to the first sequence. Optionally, by means of predefinition or configuration by the base station, for measurement based on the first sequence, the terminal determines whether measurement may be performed based on more than one sequence segment. In this way, measurement may be flexibly performed by using different sequences, and moreover, an objective that different frequency bands corresponding to different sequences correspond to different measurement can be achieved.

In this embodiment of the present invention, the processor 411 may connect at least two first sequences to generate the second sequence. Alternatively, the processor 411 may further determine at least one third sequence, where the third sequence is a predefined sequence or a sequence that is determined according to a preconfigured identifier; and connect the at least one first sequence and the at least one third sequence, to obtain the second sequence. The third sequence may be a sequence used for access. The preconfigured identifier may be a preconfigured sequence segment number or cell identifier.

In conclusion, according to the present invention, a terminal determines at least one first sequence according to at least one candidate sequence, where a length of the candidate sequence is less than a sequence length corresponding to a maximum available system bandwidth; and connects the at least one first sequence to generate a second sequence or directly uses the at least one first sequence as a second sequence, and receives a signal according to the second sequence, where the second sequence is at least one of a reference signal sequence or a scrambling code sequence. Therefore, on the basis that only several sequences or even a short sequence is generated, both the terminal and a base station can generate, by means of connection, a sequence to be actually used or directly use the sequences or the short sequence as a sequence to be actually used, that is, a second sequence. Therefore, sequence generation is more efficient and is less complex, and causes less energy consumption. Moreover, massive computation required when a sequence is generated according to a maximum system bandwidth in the prior art can be avoided, which can reduce computing resources.

Moreover, according to this embodiment of the present invention, sequences are mapped to different frequency bands more flexibly, which can therefore flexibly adapt to various different manners of using a frequency band by the terminal and the base station.

In the present invention, the second sequence is not limited to a reference signal sequence or a scrambling code sequence.

In the present invention, a description is provided by using an example in which a sequence is mapped to a frequency domain, but the present invention may also be used in a scenario in which a sequence is mapped to a time domain or a time-frequency domain.

In the present invention, a sequence is a downlink sequence, but a sequence may also be an uplink sequence, or may be a sequence transmitted between peer terminals.

Optionally, based on the sequence generation manner in the present invention, a sequence may be further processed, for example, scrambled before used.

The foregoing descriptions are merely embodiments of the present invention, and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

What is claimed is:

1. A sequence generation method, wherein the method comprises:
   determining, by a terminal, at least one first sequence according to at least one candidate sequence, wherein a length of the at least one candidate sequence is less than a sequence length corresponding to a maximum available system bandwidth; and
   connecting the at least one first sequence to generate a second sequence or directly using the at least one first sequence as the second sequence, and receiving a signal according to the second sequence, wherein the second sequence is at least one of a reference signal sequence or a scrambling code sequence;
   wherein each first sequence of the at least one first sequence is a candidate sequence of the at least one candidate sequence or a sub-sequence of a candidate sequence of the at least one candidate sequence, and the sub-sequence is a part of the candidate sequence of the at least one candidate sequence;
   obtaining, by the terminal, a sequence number, wherein the sequence number is used to generate an initialization status value of a sequence generator; and
   generating the at least one candidate sequence using the sequence number, wherein the generating the at least one candidate sequence using the sequence number comprises:
   generating, according to the following formula using the sequence number, an initialization status value that is of a sequence generator and that corresponds to the candidate sequence:

$$c_{init}=2^{10} \cdot (7 \cdot (n_s+1)+1+1) \cdot (2 \cdot N_{ID}^{seq}+1)+2 \cdot N_{ID}^{cell}+N_{CP},$$
or $$c_{init}=2^{10} \cdot (7 \cdot (n_s+1)+1+1) \cdot (2 \cdot N_{ID}^{cell}+1)+2 \cdot N_{ID}^{seq}+N_{CP},$$
or $$c_{init}=2^{10} \cdot (7 \cdot (n_s+1)+1+1) \cdot (2 \cdot N_{ID}^{seq}+1)+2 \cdot N_{ID}^{seq}+N_{CP},$$
where $c_{init}$ is the initialization status value that is of the sequence generator and that corresponds to the at least one candidate sequence, $n_s$ is a timeslot number, 1 is a number of an OFDM symbol in a timeslot, $N_{ID}^{seq}$ is the sequence number, $N_{ID}^{cell}$ is a cell number, and $N_{CP}$ is one in a case of a normal CP and $N_{CP}$ is zero in a case of an extended CP; and generating the candidate sequence according to the initialization status value $c_{init}$.

2. The method according to claim 1, wherein the step of obtaining, by the terminal, a sequence number comprises:

detecting, by the terminal, an access pilot of a frequency band that is used for access; and obtaining, by the terminal according to a detection result of the access pilot, the sequence number of at least one other frequency band except the frequency band that is used for access; or receiving, by the terminal, control signaling according to the access pilot, wherein the control signaling comprises configuration information of a pilot sequence in at least one other frequency band except the frequency band that is used for access, and obtaining, by the terminal according to the configuration information of the pilot sequence, the sequence number of the at least one other frequency band except the frequency band that is used for access; or receiving, by the terminal, control signaling sent by the base station, wherein the control signaling comprises information about at least one sequence number and/or information about a manner of forming the second sequence.

3. The method according to claim 1, wherein the generating the at least one candidate sequence using the sequence number comprises:

generating, by the terminal, a corresponding quantity of candidate sequences according to the sequence number; or generating, by the terminal, one candidate sequence according to the sequence number, and generating another candidate sequence according to a relative location of the at least one candidate sequence that is generated according to the sequence number.

4. A sequence generation method, wherein the method comprises:

determining, by a base station, at least one first sequence according to at least one candidate sequence, wherein a length of the at least one candidate sequence is less than a sequence length corresponding to a maximum available system bandwidth; and connecting the at least one first sequence to generate a second sequence or directly using the at least one first sequence as the second sequence, and sending a signal according to the second sequence, wherein the second sequence is at least one of a reference signal sequence or a scrambling code sequence;

wherein each first sequence of the at least one first sequence is a candidate sequence of the at least one candidate sequence or a sub-sequence of a candidate sequence of the at least one candidate sequence, and the sub-sequence is a part of the candidate sequence of the at least one candidate sequence;

obtaining, by the base station, a sequence number, wherein the sequence number is used to generate an initialization status value of a sequence generator; and generating the at least one candidate sequence using the sequence number, wherein the generating the at least one candidate sequence using the sequence number comprises:

generating, according to the following formula using the sequence number, an initialization status value that is of a sequence generator and that corresponds to the candidate sequence:

$c_{init}=2^{10} \cdot (7 \cdot (n_s+1)+1+1) \cdot (2 \cdot N_{ID}^{seq}+1)+2 \cdot N_{ID}^{cell}+N_{CP}$, or $c_{init}=2^{10} \cdot (7 \cdot (n_s+1)+1+1) \cdot (2 \cdot N_{ID}^{cell}+1)+2 \cdot N_{ID}^{seq}+N_{CP}$, or $c_{init}=2^{10} \cdot (7 \cdot (n_s+1)+1+1) \cdot (2 \cdot N_{ID}^{seq}+1)+2 \cdot N_{ID}^{seq}+N_{CP}$, where $c_{init}$ is the initialization status value that is of the sequence generator and that corresponds to the at least one candidate sequence, $n_s$ is a timeslot number, 1 is a number of an OFDM symbol in a timeslot, $N_{ID}^{seq}$ is the sequence number, $N_{ID}^{cell}$ is a cell number, and $N_{CP}$ is one in a case of a normal CP and $N_{CP}$ is zero in a case of an extended CP; and generating the candidate sequence according to the initialization status value $c_{init}$.

5. The method according to claim 4, wherein the step of obtaining, by the base station, a sequence number comprises:

determining, by the base station, an access pilot of a frequency band that is used for access; and determining, by the base station, the sequence number of at least one other frequency band according to a sequence relationship or a frequency band location relationship between the frequency band that is used for access and the at least one other frequency band.

6. The method according to claim 4, wherein the generating the at least one candidate sequence using the sequence number comprises:

generating, by the base station, a corresponding quantity of candidate sequences according to the sequence number; or generating, by the base station, one candidate sequence according to the sequence number, and generating another candidate sequence according to a relative location of the at least one candidate sequence that is generated according to the sequence number.

7. A terminal for sequence generation, wherein the terminal comprises:

a first determining module, configured to determine at least one first sequence according to at least one candidate sequence, wherein a length of the at least one candidate sequence is less than a sequence length corresponding to a maximum available system bandwidth; and a first generation module, connected to the first determining module, and configured to connect the at least one first sequence to generate a second sequence or directly use the at least one first sequence as the second sequence, and receive a signal according to the second sequence, wherein the second sequence is at least one of a reference signal sequence or a scrambling code sequence;

wherein each first sequence of the at least one first sequence is a candidate sequence of the at least one candidate sequence or a sub-sequence of a candidate sequence of the at least one candidate sequence, and the sub-sequence is a part of the candidate sequence of the at least one candidate sequence;

wherein the first determining module is further configured to:

obtain a sequence number, wherein the sequence number is used to generate an initialization status value of a sequence generator; and generate the at least one candidate sequence using the sequence number, by:

generating, according to the following formula using the sequence number, an initialization status value that is of a sequence generator and that corresponds to the candidate sequence:

$c_{init}=2^{10} \cdot (7 \cdot (n_s+1)+1+1) \cdot (2 \cdot N_{ID}^{seq}+1)+2 \cdot N_{ID}^{cell}+N_{CP}$, or $$c_{init}=2^{10}\cdot(7\cdot(n_s+1)+1+1)\cdot(2\cdot N_{ID}^{cell}+1)+2\cdot N_{ID}^{seq}+N_{CP},$$
or $$c_{init}=2^{10}\cdot(7\cdot(n_s+1)+1+1)\cdot(2\cdot N_{ID}^{seq}+1)+2\cdot N_{ID}^{seq}+N_{CP},$$
where $c_{init}$ is the initialization status value that is of the sequence generator and that corresponds to the at least one candidate sequence, $n_s$ is a timeslot number, 1 is a number of an OFDM symbol in a timeslot, $N_{ID}^{seq}$ is the sequence number, $N_{ID}^{cell}$ is a cell number, and $N_{CP}$ is one in a case of a normal CP and $N_{CP}$ is zero in a case of an extended CP; and generating the candidate sequence according to the initialization status value.

8. The terminal according to claim 7, wherein the first determining module is further configured to:

detect an access pilot of a frequency band that is used for access; and obtain, according to a detection result of the access pilot, the sequence number of at least one other frequency band except the frequency band that is used for access; or receive control signaling according to the access pilot, wherein the control signaling comprises configuration information of a pilot sequence in at least one other frequency band except the frequency band that is used for access, and obtain, according to the configuration information of the pilot sequence, the sequence number of the at least one other frequency band except the frequency band that is used for access; or receive control signaling sent by the base station, wherein the control signaling comprises information about at least one sequence number and/or information about a manner of forming the second sequence.

9. The terminal according to claim 8, wherein the first determining module is further configured to:

determine the sequence number of the at least one other frequency band according to sequence configuration information that is of the at least one other frequency band and that is carried in the access pilot, and/or a sequence relationship or a frequency band location relationship between the frequency band that is used for access and the at least one other frequency band.

10. The terminal according to claim 7, wherein the first determining module is further configured to:

generate a corresponding quantity of candidate sequences according to the sequence number; or generate one candidate sequence according to the sequence number, and generate another candidate sequence according to a relative location of the at least one candidate sequence that is generated according to the sequence number.

11. A base station for sequence generation, wherein the base station comprises:

a second determining module, configured to determine at least one first sequence according to at least one candidate sequence, wherein a length of the at least one candidate sequence is less than a sequence length corresponding to a maximum available system bandwidth; and a second generation module, connected to the second determining module, and configured to connect the at least one first sequence to generate a second sequence or directly use the at least one first sequence as the second sequence, and send a signal according to the second sequence, wherein the second sequence is at least one of a reference signal sequence or a scrambling code sequence;

wherein each first sequence of the at least one first sequence is a candidate sequence of the at least one candidate sequence or a sub-sequence of a candidate sequence of the at least one candidate sequence, and the sub-sequence is a part of the candidate sequence of the at least one candidate sequence;

wherein the second determining module is further configured to:

obtain a sequence number, wherein the sequence number is used to generate an initialization status value of a sequence generator; and generate the at least one candidate sequence using the sequence number, by:

generating, according to the following formula using the sequence number, an initialization status value that is of a sequence generator and that corresponds to the candidate sequence:

$$c_{init}=2^{10}\cdot(7\cdot(n_s+1)+1+1)\cdot(2\cdot N_{ID}^{seq}+1)+2\cdot N_{ID}^{cell}+N_{CP},$$
or $$c_{init}=2^{10}\cdot(7\cdot(n_s+1)+1+1)\cdot(2\cdot N_{ID}^{cell}+1)+2\cdot N_{ID}^{seq}+N_{CP},$$
or $$c_{init}=2^{10}\cdot(7\cdot(n_s+1)+1+1)\cdot(2\cdot N_{ID}^{seq}+1)+2\cdot N_{ID}^{seq}+N_{CP},$$
where $c_{init}$ is the initialization status value that is of the sequence generator and that corresponds to the at least one candidate sequence, $n_s$ is a timeslot number, 1 is a number of an OFDM symbol in a timeslot, $N_{ID}^{seq}$ is the sequence number, $N_{ID}^{cell}$ is a cell number, and $N_{CP}$ is one in a case of a normal CP and $N_{CP}$ is zero in a case of an extended CP; and generating the candidate sequence according to the initialization status value.

12. The base station according to claim 11, wherein the second determining module is further configured to:

determine an access pilot of a frequency band that is used for access; and determine the sequence number of the at least one other frequency band according to a sequence relationship or a frequency band location relationship between the frequency band that is used for access and the at least one other frequency band.

13. The base station according to claim 11, wherein the second determining module is further configured to:

generate a corresponding quantity of candidate sequences according to the sequence number; or generate one candidate sequence according to the sequence number, and generate another candidate sequence according to a relative location of the at least one candidate sequence that is generated according to the sequence number.

* * * * *

UNITED STATES PATENT AND TRADEMARK OFFICE
CERTIFICATE OF CORRECTION

PATENT NO. : 10,177,889 B2
APPLICATION NO. : 15/360815
DATED : January 8, 2019
INVENTOR(S) : Sun et al.

Page 1 of 1

It is certified that error appears in the above-identified patent and that said Letters Patent is hereby corrected as shown below:

In the Claims

Claim 1, Column 40, Line 56, "where" should read -- wherein --.

Claim 7, Column 43, Line 4, "where" should read -- wherein --.

Claim 11, Column 44, Line 33, "where" should read -- wherein --.

Signed and Sealed this
Twenty-sixth Day of November, 2019

Andrei Iancu
*Director of the United States Patent and Trademark Office*